(12) United States Patent
Li et al.

(10) Patent No.: US 11,350,435 B2
(45) Date of Patent: *May 31, 2022

(54) METHOD FOR OBTAINING REQUEST OF STATION, ACCESS POINT, AND STATION

(71) Applicant: Huawei Technologies Co., Ltd., Shenzhen (CN)

(72) Inventors: Bo Li, Xi'an (CN); Qiao Qu, Xi'an (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,883

(22) Filed: Jul. 1, 2020

(65) Prior Publication Data

US 2020/0337070 A1 Oct. 22, 2020

Related U.S. Application Data

(63) Continuation of application No. 15/624,791, filed on Jun. 16, 2017, now Pat. No. 10,728,917, which is a continuation of application No. PCT/CN2014/094221, filed on Dec. 18, 2014.

(51) Int. Cl.
| | |
|---|---|
| *H04W 4/00* | (2018.01) |
| *H04W 72/12* | (2009.01) |
| *H04W 74/02* | (2009.01) |
| *H04W 24/02* | (2009.01) |
| *H04W 74/00* | (2009.01) |
| *H04W 84/12* | (2009.01) |

(52) U.S. Cl.
CPC ....... *H04W 72/1268* (2013.01); *H04W 24/02* (2013.01); *H04W 74/02* (2013.01); *H04W 74/006* (2013.01); *H04W 84/12* (2013.01)

(58) Field of Classification Search
CPC . H04W 72/1268; H04W 74/02; H04W 24/02; H04W 74/006; H04W 84/12
USPC .................................................. 370/329, 330
See application file for complete search history.

(56) References Cited

U.S. PATENT DOCUMENTS

| | | | |
|---|---|---|---|
| 10,523,380 B2 | 12/2019 | Guan | |
| 10,728,917 B2 * | 7/2020 | Li | .......................... H04W 74/02 |
| (Continued) | | | |

FOREIGN PATENT DOCUMENTS

| | | |
|---|---|---|
| CN | 101394656 A | 3/2009 |
| CN | 101453755 A | 6/2009 |
| (Continued) | | |

OTHER PUBLICATIONS

IEEE, "Part 11: Wireless LAN Medium Access Control (MAC) and Physical Layer (PHY) Specifications Amendment 4: Enhancements for Very High Throughput for Operation in Bands below 6 GHz", IEEE Std 802.11ac, 2013, 425 pages.

*Primary Examiner* — Chuong T Ho
(74) *Attorney, Agent, or Firm* — Slater Matsil, LLP

(57) ABSTRACT

Embodiments of the present invention disclose a method for obtaining a request of a station, an access point, and a station. The method includes sending, by an access point, a control frame to a station and receiving, by the access point, a request to send frame sent by each station according to the control frame. The method also includes performing, by the access point, resource scheduling on each station according to the received request to send frame.

20 Claims, 11 Drawing Sheets

(56) References Cited

U.S. PATENT DOCUMENTS

| | | | |
|---|---|---|---|
| 2008/0080422 A1* | 4/2008 | Frederiksen | H04L 5/0091 370/329 |
| 2008/0259846 A1 | 10/2008 | Gonikberg et al. | |
| 2009/0005057 A1 | 1/2009 | Lee et al. | |
| 2011/0002291 A1 | 1/2011 | Gonikberg et al. | |
| 2012/0230261 A1 | 9/2012 | Pradas et al. | |
| 2013/0163460 A1 | 6/2013 | Gonikberg et al. | |
| 2013/0235773 A1 | 9/2013 | Wang et al. | |
| 2014/0064206 A1 | 3/2014 | Bao et al. | |
| 2014/0086168 A1 | 3/2014 | Bao et al. | |
| 2015/0304889 A1 | 10/2015 | Qian et al. | |
| 2015/0341954 A1 | 11/2015 | Li et al. | |
| 2015/0382283 A1* | 12/2015 | Wang | H04W 52/02 370/328 |
| 2016/0050693 A1 | 2/2016 | Yang et al. | |
| 2016/0234858 A1 | 8/2016 | Bao et al. | |
| 2016/0255656 A1* | 9/2016 | Lou | H04L 1/1685 370/335 |
| 2020/0068479 A1* | 2/2020 | Jiang | H04W 48/12 |

FOREIGN PATENT DOCUMENTS

| | | |
|---|---|---|
| CN | 101483828 A | 7/2009 |
| CN | 102594538 A | 7/2012 |
| CN | 102752869 A | 10/2012 |
| CN | 102769516 A | 11/2012 |
| CN | 103313367 A | 9/2013 |
| CN | 103327613 A | 9/2013 |
| CN | 103476130 A | 12/2013 |
| CN | 103650579 A | 3/2014 |
| CN | 103974447 A | 8/2014 |
| CN | 104125046 A | 10/2014 |
| CN | 104125648 A | 10/2014 |
| CN | 104160757 A | 11/2014 |
| WO | 2012096441 A2 | 7/2012 |
| WO | 2014074071 A1 | 5/2014 |
| WO | 2014074074 A1 | 5/2014 |

* cited by examiner

METHOD FOR OBTAINING REQUEST OF STATION, ACCESS POINT, AND STATION

CROSS-REFERENCE TO RELATED APPLICATIONS

This application is a continuation of U.S. patent application Ser. No. 15/624,791, filed on Jun. 16, 2017, which is a continuation of International Application No. PCT/CN2014/094221, filed on Dec. 18, 2014. All of the afore-mentioned patent applications are hereby incorporated by reference in their entireties.

TECHNICAL FIELD

The present embodiments relates to the field of wireless local area network technologies, and in particular, to a method for obtaining a request of a station, an access point, and a station.

BACKGROUND

A base station in a WLAN (wireless local area network) is also referred to as an AP (access point). Currently, in a WLAN system, an OFDM (orthogonal frequency division multiplexing) technology is generally used for transmission. However, to improve system efficiency, introduction of an uplink multi-users technology, such as an uplink OFDMA (orthogonal frequency division multiple access) technology and uplink multi-user MIMO (Multiple-Input Multiple-Output) technology, is under consideration into a standard. In the uplink multi-user technology, a problem that needs to be resolved is how the AP obtains an uplink data request of a STA (station).

Currently, there are multiple technologies for obtaining the uplink data request of the STA.

In a first technology, the uplink data request is obtained by means of random competition. Because random competition does not need a central station to control a network, random competition has a simple structure and flexible networking and is widely applied to a distributed network. However, when system load is very large and competition increases, conflict avoidance is relatively difficult, and an access requirement of a specific service cannot be met.

In a second technology, the uplink data request is obtained by means of polling. That is, the AP specifies multiple STAs to send uplink data requests on specified sub-channels by means of OFDMA. Because it is unknown which STAs have cached data, polling is blindly performed. As a result, system efficiency is reduced because the AP polls a large quantity of STAs that have no uplink data.

SUMMARY

Embodiments of the present invention provide a method for obtaining a request of a station, an access point, and a station, so as to meet an access requirement of a specific service and avoid invalid feedbacks from a large quantity of station s, thereby improving system efficiency.

A first aspect of the embodiments of the present invention provides a method for obtaining a request of a station, including sending, by an access point, a control frame to the station, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station. The method also includes receiving, by the access point, a request to send frame sent by each station according to the control frame and performing, by the access point, resource scheduling on each station according to the received request to send frame.

In a first possible implementation of the first aspect, if the available channels include one idle channel, before the sending, by an access point, a control frame to the station, the sending further includes: using, by the access point, a part of sub-channels of the idle channel as the used-for-scheduling channel, and using the other part of the sub-channels of the idle channel as the random competition channel.

In a second possible implementation of the first aspect, if the available channels include at least two idle channels, before the sending, by an access point, a control frame to the station, the method further includes: using, by the access point, a part of the at least two idle channels as the used-for-scheduling channel, and using the other part of the idle channels as the random competition channel.

With reference to the second possible implementation of the first aspect, in a third possible implementation, if the available channels include one preset primary channel and at least one secondary channel, the using, by the access point, a part of the at least two idle channels as the used-for-scheduling channel, and using the other part of the idle channels as the random competition channel includes: using, by the access point, the primary channel as the used-for-scheduling channel, and using the at least one secondary channel as the random competition channel.

In a fourth possible implementation of the first aspect, if the available channels include at least two idle channels, before the sending, by an access point, a control frame to the station, the method further includes: using, by the access point, a part of sub-channels of each idle channel as the used-for-scheduling channel, and using the other part of the sub-channels of each idle channel as the random competition channel.

With reference to any one of the first aspect, or the first to the fourth possible implementations of the first aspect, in a fifth possible implementation, the device indication information is further used to indicate the non-to-be-scheduled station.

With reference to any one of the first aspect, or the first to the fourth possible implementations of the first aspect, in a sixth possible implementation, before the sending, by an access point, a control frame to the station, the method further includes: selecting, by the access point, the to-be-scheduled station from the station s according to service priorities of the station s.

With reference to any one of the first aspect, or the first to the sixth possible implementations of the first aspect, in a seventh possible implementation, the information about the selectable random competition channel is used to indicate the selectable random competition channel, and the selectable random competition channel is obtained by removing the used-for-scheduling channel from the available channels.

A second aspect of the embodiments of the present invention provides a method for obtaining a request of a station, including receiving, by the station, a control frame sent by an access point, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station. The method also includes determining, by the station according to the device indication information, whether the station is the to-be-scheduled station. Additionally, the method includes if yes, determining, by the station, a corresponding used-for-scheduling channel according to the allocation information of the available channels, and sending a request to send frame by using the determined used-for-scheduling channel or if no, selecting, by the station, at least one idle channel or idle sub-channel from the random competition channel according to the allocation information of the available channels, and sending a request to send frame by using the selected idle channel or idle sub-channel.

In a first possible implementation of the second aspect, if the station is the to-be-scheduled station, before the determining, by the station, a corresponding used-for-scheduling channel according to the allocation information of the available channels, the method further includes: determining, by the station, that cached data exists on the station.

In a second possible implementation of the second aspect, the device indication information is further used to indicate the non-to-be-scheduled station, and if the station is not the to-be-scheduled station, before the selecting, by the station, at least one idle channel or idle sub-channel from the random competition channel according to the allocation information of the available channels, the method further includes: determining, by the station according to the device indication information, that the station is the non-to-be-scheduled station.

With reference to any one of the second aspect, or the first or the second possible implementation of the second aspect, in a third possible implementation, the method further includes: starting, by the station, waiting upon receiving the control frame, and performing, only when waiting duration is equal to preset duration, the step of sending a request to send frame by using the determined used-for-scheduling channel.

A third aspect of the embodiments of the present invention provides an access point, including: a sending module, configured to send a control frame to a station, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station; a receiving module, configured to receive a request to send frame sent by each station according to the control frame; and a scheduling module, configured to perform resource scheduling on each station according to the received request to send frame.

In a first possible implementation of the third aspect, if the available channels include one idle channel, the device further includes: a first channel allocation module, configured to use a part of sub-channels of the idle channel as the used-for-scheduling channel and use the other part of the sub-channels of the idle channel as the random competition channel.

In a second possible implementation of the third aspect, if the available channels include at least two idle channels, the device further includes: a second channel allocation module, configured to use a part of the at least two idle channels as the used-for-scheduling channel and use the other part of the idle channels as the random competition channel.

With reference to the second possible implementation of the third aspect, in a third possible implementation, if the available channels include one preset primary channel and at least one secondary channel, the second channel allocation module is specifically configured to: use the primary channel as the used-for-scheduling channel, and use the at least one secondary channel as the random competition channel.

In a fourth possible implementation of the third aspect, if the available channels include at least two idle channels, the device further includes: a third channel allocation module, configured to use a part of sub-channels of each idle channel as the used-for-scheduling channel and use the other part of the sub-channels of each idle channel as the random competition channel.

With reference to any one of the third aspect, or the first to the fourth possible implementations of the third aspect, in a fifth possible implementation, the device indication information is further used to indicate the non-to-be-scheduled station.

With reference to any one of the third aspect, or the first to the fourth possible implementations of the third aspect, in a sixth possible implementation, the device further includes: a selection module, configured to select the to-be-scheduled station from the station s according to service priorities of the station s.

With reference to any one of the third aspect, or the first to the sixth possible implementations of the third aspect, in a seventh possible implementation, the information about the selectable random competition channel is used to indicate the selectable random competition channel, and the selectable random competition channel is obtained by removing the used-for-scheduling channel from the available channels.

A fourth aspect of the embodiments of the present invention provides a station, including: a receiving module, configured to receive a control frame sent by an access point, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station; a determining module, configured to determine, according to the device indication information, whether the station is the to-be-scheduled station; a processing module, configured to determine a corresponding used-for-scheduling channel according to the allocation information of the available channels if the determining module determines that the station is the to-be-scheduled station; and a sending module, configured to send a request to send frame by using the determined used-for-scheduling channel, so that the access point performs resource scheduling on the station according to the request to send frame; where the processing module is further configured to: select at least one idle channel or idle sub-channel from the random competition channel according to the allocation information of the available channels if the determining module determines that the station is not the to-be-scheduled station; and the sending module is further configured to: send a request to send frame by using the selected idle channel or idle sub-channel.

In a first possible implementation of the fourth aspect, the device further includes: a detection module, configured to: if the determining module determines that the station is the to-be-scheduled station, detect whether cached data exists on the station; and if it is detected that cached data exists, trigger the processing module to determine the corresponding used-for-scheduling channel according to the allocation information of the available channels.

In a second possible implementation of the fourth aspect, the device indication information is further used to indicate the non-to-be-scheduled station, and if the station is not the to-be-scheduled station, the determining module is further configured to: determine, according to the device indication information, whether the station is the non-to-be-scheduled station; and if it is determined that the station is the non-to-be-scheduled station, trigger the processing module to select the at least one idle channel or idle sub-channel from the random competition channel.

With reference to any one of the fourth aspect, or the first or the second possible implementation of the fourth aspect, in a third possible implementation, the sending module is further configured to: start waiting when the receiving module receives the control frame, and send, by using the determined used-for-scheduling channel, the request to send frame only when waiting duration is equal to preset duration.

A fifth aspect of the embodiments of the present invention further provides an access point, where the access point includes a radio signal transceiver apparatus, a memory, and a processor, where the memory stores a set of program code, and the processor is configured to invoke the program code stored in the memory, to perform the following operations: sending a control frame to a station, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station; receiving a request to send frame sent by each station according to the control frame; and performing resource scheduling on each station according to the received request to send frame.

A sixth aspect of the embodiments of the present invention further provides a station, where the station includes a radio signal transceiver apparatus, a memory, and a processor, where the memory stores a set of program code, and the processor is configured to invoke the program code stored in the memory, to perform the following operations: receiving, by the station, a control frame sent by an access point, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station; determining, by the station according to the device indication information, whether the station is the to-be-scheduled station; and if yes, determining, by the station, a corresponding used-for-scheduling channel according to the allocation information of the available channels, and sending a request to send frame by using the determined used-for-scheduling channel; or if no, selecting, by the station, at least one idle channel or idle sub-channel from the random competition channel according to the allocation information of the available channels, and sending a request to send frame by using the selected idle channel or idle sub-channel.

A seventh aspect of the embodiments of the present invention further provides a computer storage medium, where the computer storage medium stores a program, and during execution of the program, some or all of the steps of the method for obtaining a request of a station provided according to the first aspect are performed.

An eighth aspect of the embodiments of the present invention further provides a computer storage medium, where the computer storage medium stores a program, and during execution of the program, some or all of the steps of the method for obtaining a request of a station provided according to the second aspect are performed.

A ninth aspect of the embodiments of the present invention further provides a system for obtaining a request of a station, where the system includes an access point and at least one station, where: the access point is the access point according to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, or the seventh possible implementation of the third aspect; and the station is the station according to the fourth aspect, the first possible implementation of the fourth aspect, the second possible implementation of the fourth aspect, or the third possible implementation of the fourth aspect.

It can be learnt from the foregoing descriptions that, according to the embodiments of the present invention, a control frame is sent to a station, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station; and a request to send frame sent by each station according to the control frame is received. This can not only meet an access requirement of a specific service but also avoid invalid feedbacks from a large quantity of station s, thereby improving system efficiency.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
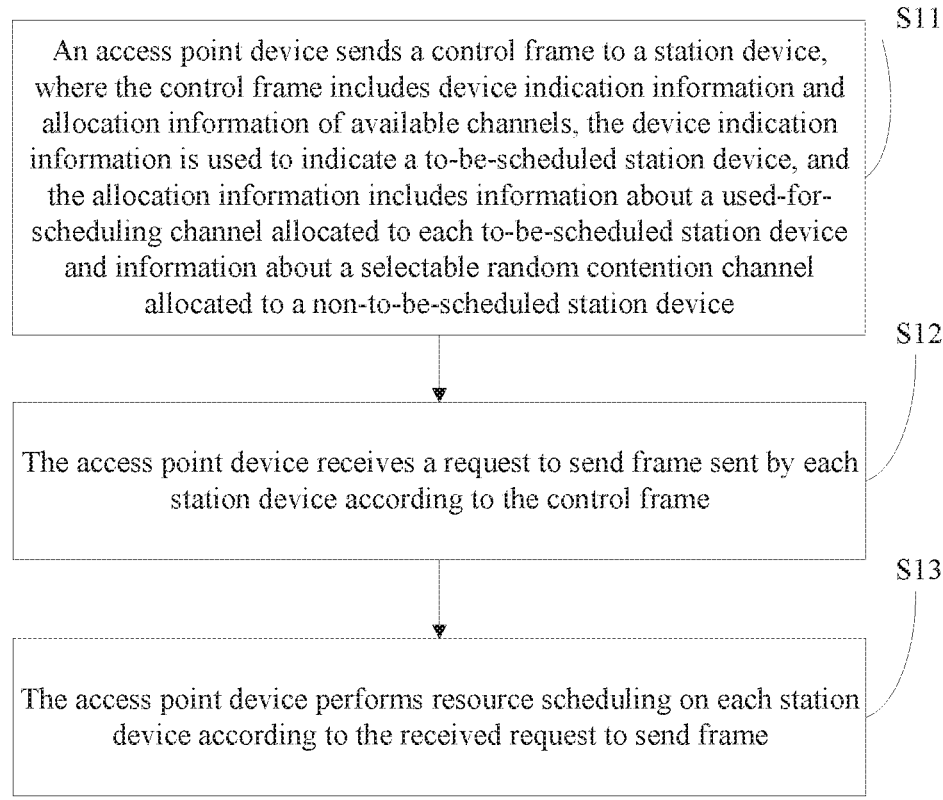
FIG. 1 is a schematic diagram of a method for obtaining a request of a station according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present embodiments.

The embodiments of the present invention can be applied to a wireless local area network. The wireless local area network may be a BSS (basic service set) that includes an access point. It should be understood that, in a basic network structure of a WiFi (Wireless Fidelity) system, a network may include multiple basic service sets, and each basic service set may include an AP (access point) and multiple STAs (stations) associated with the AP.

The AP is also referred to as a wireless access point, a hotspot, or the like. The AP is an access point through which a mobile subscriber accesses a wired network, and is mainly deployed inside homes, buildings, and campuses. A typical coverage radius is tens of meters to a hundred meters. Alternatively, the AP may be deployed outdoors. The AP is equivalent to a bridge that connects the wired network and a wireless network. A main function of the AP is to connect wireless network clients together and then connect the wireless network to the Ethernet.

Main standards used for the AP are the IEEE (Institute of Electrical and Electronics Engineers) 802.11 series. Specifically, the AP may be a terminal device with a WiFi chip or a network device with a WiFi chip. Optionally, the AP may be a device that supports the 802.11ax standard. Further optionally, the AP may be a device that supports multiple WLAN (wireless local area network) standards, for example, 802.11ac, 802.11n, 802.11g, 802.11b, and 802.11a.

The STA may be a wireless communications chip, a wireless sensor, or a wireless communications terminal, for example, a mobile phone that supports a WiFi communication function, a tablet computer that supports a WiFi communication function, a set-top box that supports a WiFi communication function, or a computer that supports a WiFi communication function. Optionally, the station may support the 802.11ax standard. Further optionally, the station supports multiple WLAN standards, for example, 802.11ac, 802.11n, 802.11g, 802.11b, and 802.11a.

Currently, one of bandwidths 20 MHz, 40 MHz, 80 MHz, and 160 MHz (80+80 MHz) is used for the WLAN. However, because the present embodiments have no inevitable relationship with an actual bandwidth of a single channel or actual bandwidths of multiple channels, another bandwidth may be used in an implementation of the present embodiments. In the present embodiments, descriptions are provided by using an example in which a channel whose bandwidth is 20 MHz is used as a single channel and multiple 20 MHz channels are used as multiple channels.

The following further clarifies the present embodiments with reference to specific embodiments. It should be understood that these embodiments are merely intended to describe the present embodiments, but are not intended to limit the scope of the present embodiments. All modifications in equivalent forms made to the present embodiments by persons skilled in the art after reading the present embodiments fall within the scope limited by the claims accompanying this application.

Referring to FIG. 1, FIG. 1 is a schematic diagram of a method for obtaining a request of a station according to an embodiment of the present invention. This embodiment of the present invention provides descriptions from a perspective of an access point. As shown in FIG. 1, the method for obtaining a request of a station in this embodiment of the present invention may include the following steps.

S11: The access point sends a control frame to the station, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station.

The available channels may be continuous channels, or may be discrete channels. This is not limited in the present embodiments.

Optionally, the non-to-be-scheduled station may include a station in a basic service set except the to-be-scheduled station indicated by the device indication information. It is assumed that the basic service set includes a STA 1, a STA 2, a STA 3, a STA 4, and a STA 5, and the device indication information indicates that the STA 1 and the STA 2 are to-be-scheduled station s. In this case, the STA 3, the STA 4, and the STA 5 are non-to-be-scheduled station s. That is, the STA 3, the STA 4, and the STA 5 can access a channel by means of random competition.

Further, the device indication information is further used to indicate the non-to-be-scheduled station, and the non-to-be-scheduled station is determined according to the device indication information. It is assumed that the basic service set still includes the STA 1, the STA 2, the STA 3, the STA 4, and the STA 5, and the device indication information indicates that the STA 1 and the STA 2 are the to-be-scheduled station s and the STA 3 and the STA 4 are the non-to-be-scheduled station s. That is, the STA 5 cannot access a channel. A probability of data collision can be effectively controlled by controlling a quantity of station s that participate in random competition. In this way, system efficiency is further improved.

Optionally, the access point may select the to-be-scheduled station from the station s according to service priorities of the station s, and then allocate a corresponding used-for-scheduling channel to each to-be-scheduled station. The random competition channel is the available channels except the used-for-scheduling channel. Selecting a to-be-scheduled station according to the service priorities of the station s ensures that an access requirement of a high-priority service is met.

If the available channels include one idle channel, that is, an idle channel of 20 MHz, the access point may use a part of sub-channels of the idle channel as the used-for-scheduling channel, and use the other part of the sub-channels of the idle channel as the random competition channel. Division of the sub-channels may be defined by a standard, or may be performed by the access point. This is not limited in the present embodiments.

Figure 2:
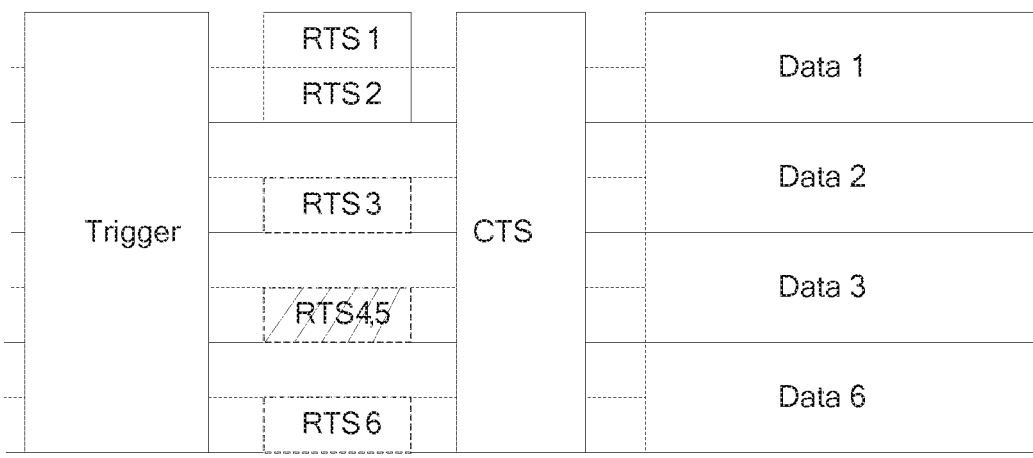
FIG. 2 is a schematic diagram of a hybrid single-channel access manner according to an embodiment of the present invention.

As shown in FIG. 2, it is assumed that the idle channel is divided into eight sub-channels, a STA 1 and a STA 2 are the to-be-scheduled station s, and a STA 3 to a STA 6 are the non-to-be-scheduled station s. The access point may use a sub-channel 1 as a used-for-scheduling channel and allocate the sub-channel 1 to the STA 1, use a sub-channel 2 as a used-for-scheduling channel and allocate the sub-channel 2 to the STA 2, and use the other sub-channels 3 to 8 as selectable random competition channels.

If the available channels include at least two idle channels, the access point may use a part of the at least two idle channels as the used-for-scheduling channel, and use the other part of the idle channels as the random competition channel.

Further, if the available channels include one preset primary channel and at least one secondary channel, the access point may use the primary channel as the used-for-scheduling channel, and use the at least one secondary channel as the random competition channel.

Still further, each of the at least two idle channels may include multiple sub-channels. The access point may use all sub-channels of a part of the idle channels as the used-for-scheduling channels, and use all sub-channels of the other part of the idle channels as the random competition channels.

Figure 3:
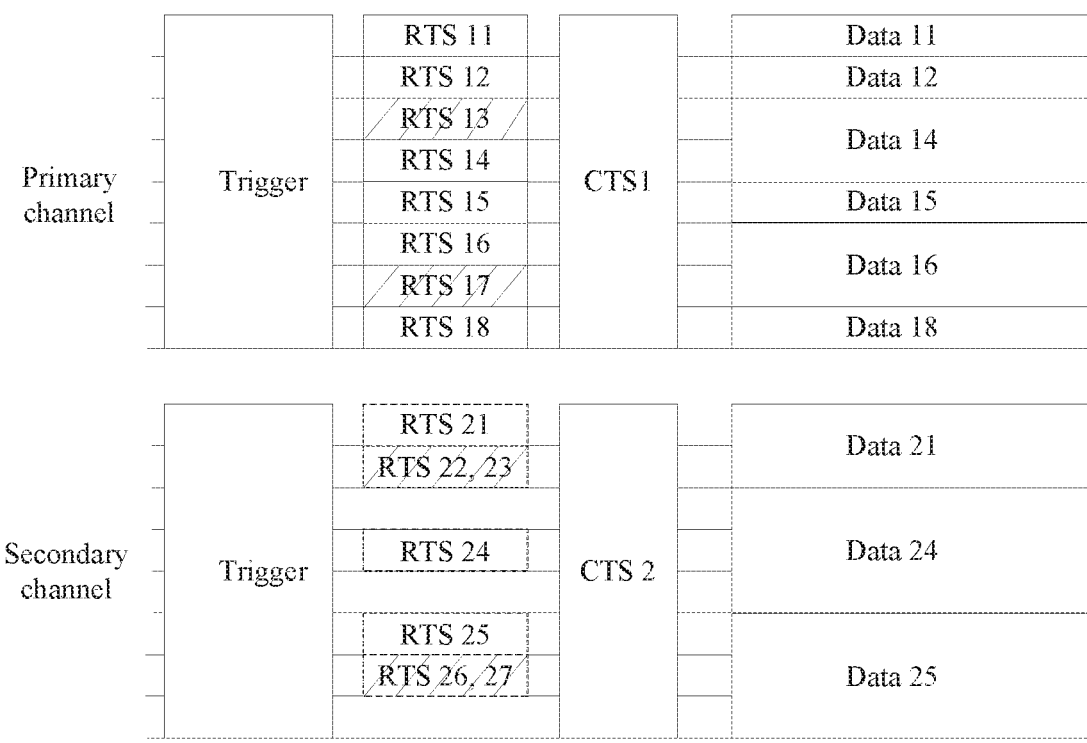
FIG. 3 is a schematic diagram of a hybrid multi-channel access manner according to an embodiment of the present invention.

For example, there are two idle channels. It is assumed that one of the idle channels is a primary channel, and the other idle channel is a secondary channel. As shown in FIG. 3, each idle channel is divided into eight sub-channels, a STA 11 to a STA 18 are to-be-scheduled station s, and a STA 21 to a STA 27 are non-to-be-scheduled station s. The access point may use eight sub-channels of the primary channel as used-for-scheduling channels and allocate the eight sub-channels of the primary channel to the STA 11 to the STA 18 respectively, and use eight sub-channels of the secondary channel as selectable random competition channels.

If the available channels include at least two idle channels, the access point may use a part of sub-channels of each idle channel as the used-for-scheduling channel, and use the other part of the sub-channels of each idle channel as the random competition channel.

Still for example, there are two idle channels. It is assumed that one of the idle channels is the primary channel, the other idle channel is the secondary channel, and each idle channel is divided into eight sub-channels; a STA 11, a STA 12, a STA 21, and a STA 22 are to-be-scheduled station s, and a STA 13 to a STA 16 and a STA 23 to a STA 26 are non-to-be-scheduled station s. In this case, the access point may allocate a used-for-scheduling channel in either of the following two manners.

Figure 4:
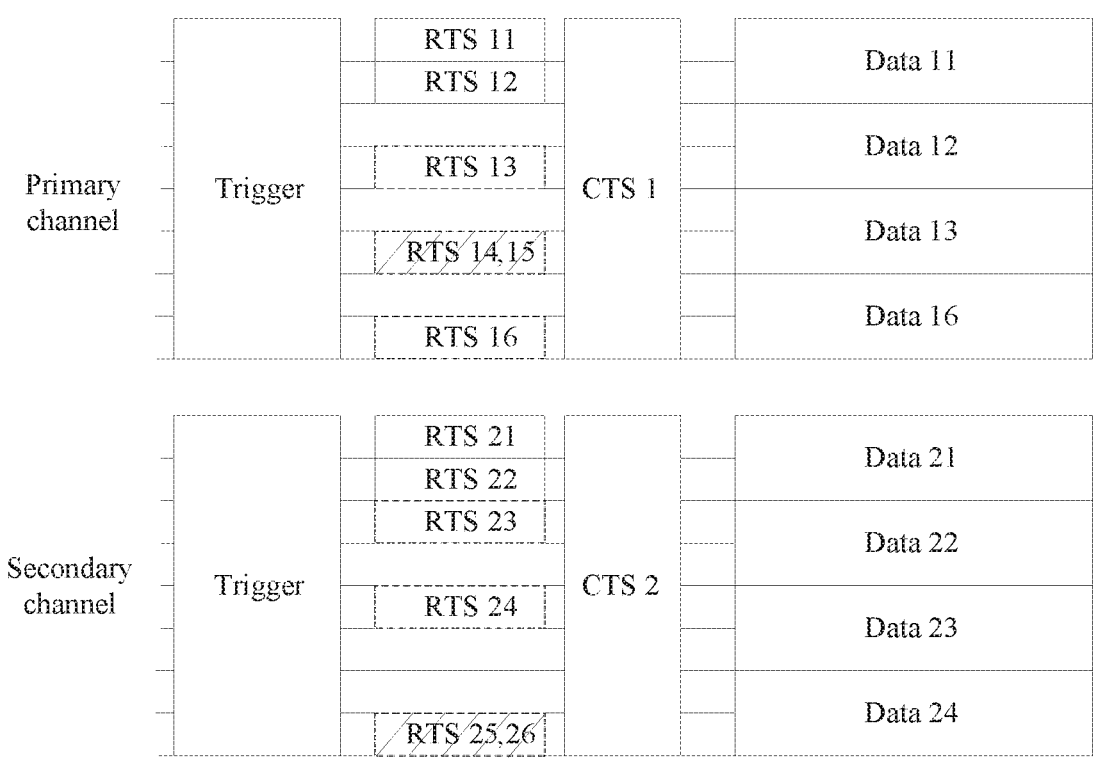
FIG. 4 is a schematic diagram of another hybrid multi-channel access manner according to an embodiment of the present invention.

In a first manner, locations of used-for-scheduling sub-channels on each idle channel are the same. As shown in FIG. 4, the access point allocates a sub-channel 1 and a sub-channel 2 of the primary channel to the to-be-scheduled stations the STA 11 and the STA 12, and similarly, allocates a sub-channel 1 and a sub-channel 2 of the secondary channel to the to-be-scheduled stations the STA 21 and the STA 22; the other sub-channels are used as the random competition channels.

In a second manner, locations of used-for-scheduling sub-channels on each idle channel are different. For example, the access point allocates a sub-channel 1 and a sub-channel 2 of the primary channel to the to-be-scheduled stations the STA 11 and the STA 12, and allocates a sub-channel 3 and a sub-channel 4 of the secondary channel to the to-be-scheduled stations the STA 21 and the STA 22; the other sub-channels are used as the random competition channels.

The control frame may be shown in Table 1. The device indication information may be represented by a Scheduled STAs field, and is used to indicate a to-be-scheduled station. For example, a STA 1 and a STA 2 are to-be-scheduled stations, and the Scheduled STAs field may include device identifier information of the STA 1 and the STA 2.

Frame control is used to indicate a frame type, such as a reserved frame. Receiver address (RA) is an address on a wireless medium, that is, a destination address at which the control frame is received, that is, an address of each station. Transmitter address (TA) is an address at which the control frame is sent, that is, an address of the access point. Frame check sequence (FCS) is an error check code and records a check code of a frame, and a cyclic redundancy code (CRC)-32 technology may be used.

In an optional implementation, the allocation information of the available channels may be indicated by using a Scheduled sub-channels field and a Random access sub-channels field. The Scheduled sub-channels field includes the information about the used-for-scheduling channel allocated to each to-be-scheduled station. For example, in FIG. 2, a Scheduled STAs field indicates that a STA 1 and a STA 2 are to-be-scheduled station s. A Scheduled sub-channels field may indicate that a sub-channel 1 is allocated to the STA 1 and a sub-channel 2 is allocated to the STA 2. A Random access sub-channels field includes information about a selectable random competition channel allocated to a non-to-be-scheduled station. For example, the Random access sub-channels field indicates that the other sub-channels 3 to 8 are used as random competition channels.

TABLE 1

| Frame control | RA | TA | Scheduled sub-channels | Scheduled STAs | Random access sub-channels | FCS |
| --- | --- | --- | --- | --- | --- | --- |

In another optional implementation, the allocation information of the available channels may be indicated by using a Scheduled sub-channels field and an Available sub-channels field, as shown in Table 2. That is, the control frame does not explicitly indicate a random competition channel. The selectable random competition channel is obtained by removing the used-for-scheduling channel from the available channels, that is, by removing a channel indicated by the Scheduled sub-channels field from channels indicated by the Available sub-channels field.

TABLE 2

| Frame control | RA | TA | Available sub-channels | Scheduled sub-channels | Scheduled STAs | FCS |
|---|---|---|---|---|---|---|

S12: The access point receives a request to send frame sent by each station according to the control frame.

Specifically, after each station, for example, a target station, receives the control frame, the target station first determines, according to the device indication information, whether the target station is the to-be-scheduled station. If the target station is the to-be-scheduled station, the target station determines a corresponding used-for-scheduling channel according to the allocation information of the available channels, and sends the RTS frame (request to send frame) by using the determined used-for-scheduling channel.

If the target station is not the to-be-scheduled station, the target station selects at least one idle channel or idle sub-channel from the random competition channel according to the allocation information of the available channels, and sends the request to send frame by using the selected idle channel or idle sub-channel.

S13: The access point performs resource scheduling on each station according to the received request to send frame.

Specifically, a scheduling policy may be flexibly adjusted according to a status of the received request to send frames and an idleness status of a sub-channel. It is assumed that the status of the request to send frames received by the access point is shown in FIG. 2. Because request to send frames sent by the STA 4 and the STA 5 collide, the access point cannot normally receive the corresponding request to send frames. As a result, the access point determines that the STA 4 and the STA 5 have no cached data, and allocates the sub-channel to another station. The access point may use a CTS frame (clear to send frame) to instruct the STA 1 to transmit Data 1 on the sub-channel 1 and the sub-channel 2, instruct the STA 2 to transmit Data 2 on the sub-channel 3 and the sub-channel 4, instruct the STA 3 to transmit Data 3 on the sub-channel 5 and the sub-channel 6, and instruct the STA 6 to transmit Data 6 on the sub-channel 7 and the sub-channel 8.

It should be noted that a specific sending format of the CTS (for example, to send the CTS by using an entire bandwidth or a sub-channel) does not belong to the present embodiments and is not limited. Any other implementation is applicable to this embodiment of the present invention.

In the embodiment shown in FIG. 2, an access point may send a control frame to a station, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station. Dividing the available channels into the used-for-scheduling channel and the random competition channel can not only meet an access requirement of a specific service but also avoid invalid feedbacks from a large quantity of station s, thereby improving system efficiency.

Figure 5:
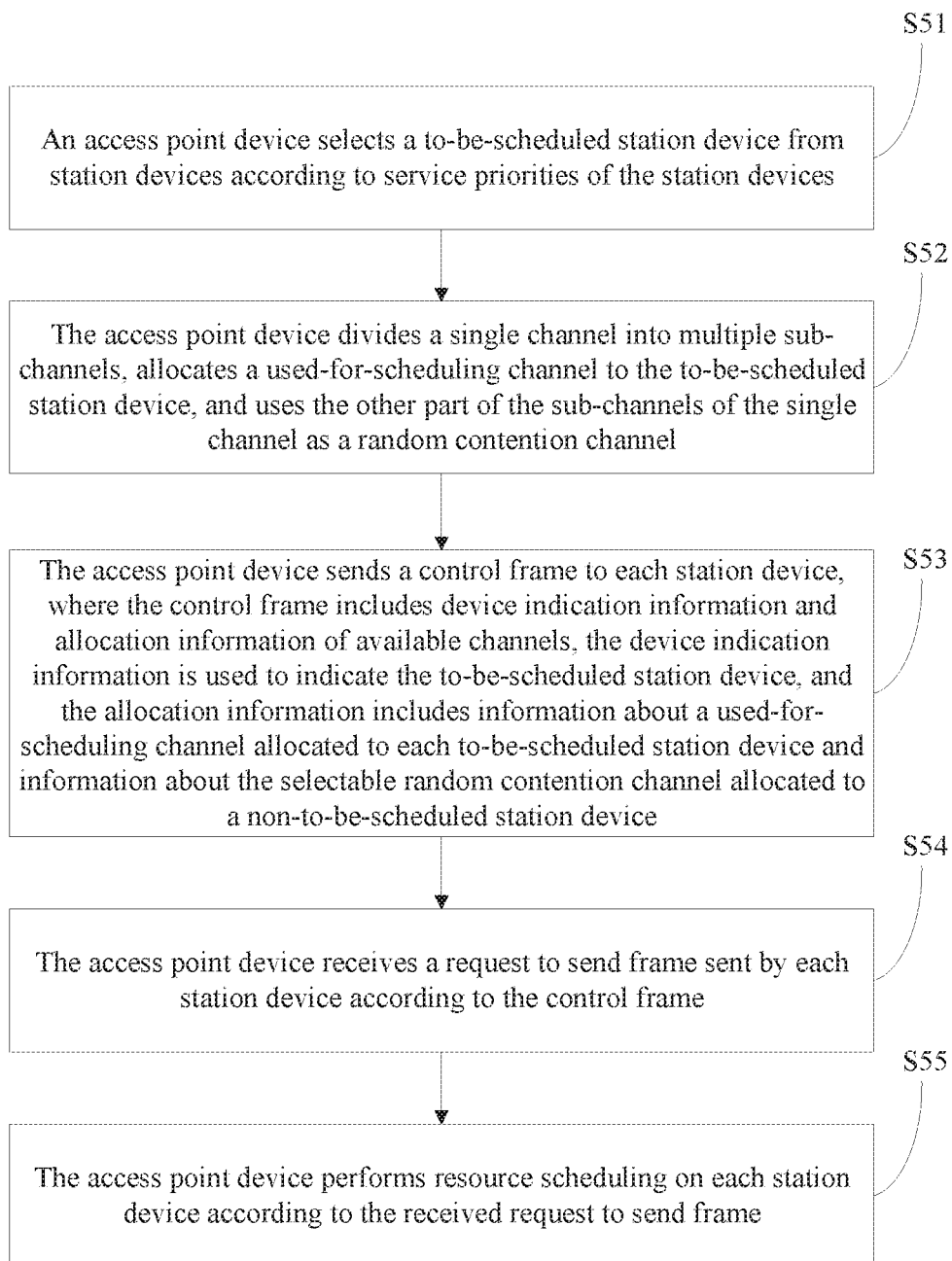
FIG. 5 is a schematic diagram of another method for obtaining a request of a station according to an embodiment of the present invention.

Referring to FIG. 5, FIG. 5 is a schematic diagram of another method for obtaining a request of a station according to an embodiment of the present invention. This embodiment of the present invention provides descriptions from a perspective of an access point. Available channels in this embodiment of the present invention include one idle channel, that is, an idle channel of 20 MHz. As shown in FIG. 5, the method for obtaining a request of a station in this embodiment of the present invention may include the following steps.

S51: The access point selects a to-be-scheduled station from station s according to service priorities of the station s.

It should be noted that, in this embodiment of the present invention, the access point selects the to-be-scheduled station according to the service priorities of the station s. In another optional embodiment, the to-be-scheduled station may be selected in another manner, which may be adjusted according to an actual application. This is not limited in the present embodiments.

Optionally, a non-to-be-scheduled station may include a station in a basic service set except the to-be-scheduled station. It is assumed that the basic service set includes a STA 1, a STA 2, a STA 3, a STA 4, and a STA 5, and the STA 1 and the STA 2 are to-be-scheduled station s. In this case, the STA 3, the STA 4, and the STA 5 are non-to-be-scheduled station s.

Further, the access point may further control a quantity of non-to-be-scheduled station s. That is, not all station s other than the to-be-scheduled station can access a channel. It is assumed that the basic service set still includes the STA 1, the STA 2, the STA 3, the STA 4, and the STA 5, and the STA 1 and the STA 2 are to-be-scheduled station s. The access point controls a quantity of non-to-be-scheduled station s to be 2. In this case, one of the STA 3, the STA 4, and the STA 5 cannot access a channel. It is assumed that the STA 3 and the STA 4 are non-to-be-scheduled station s, that is, the STA 5 cannot access the channel. Controlling a quantity of devices participating in random competition can effectively control a probability of data collision, so as to further improve system efficiency.

S52: The access point divides a single channel into multiple sub-channels, allocates a used-for-scheduling channel to the to-be-scheduled station, and uses the other part of the sub-channels of the single channel as a random competition channel.

As shown in FIG. 2, it is assumed that the single channel is divided into eight sub-channels. A STA 1 and a STA 2 are to-be-scheduled station s, and a STA 3 to a STA 5 are non-to-be-scheduled station s. The access point may use a sub-channel 1 as a used-for-scheduling channel and allocate the sub-channel 1 to the STA 1, use a sub-channel 2 as a used-for-scheduling channel and allocate the sub-channel 2 to the STA 2, and use the other sub-channels 3 to 8 as the selectable random competition channels.

S53: The access point sends a control frame to each station, where the control frame includes device indication information and allocation information of the available channels, the device indication information is used to indicate the to-be-scheduled station, and the allocation information includes information about a used-for-scheduling channel allocated to each to-be-scheduled station and information about a selectable random competition channel allocated to a non-to-be-scheduled station.

The device indication information may be represented by a Scheduled STAs field, and is used to indicate a to-be-scheduled station. For example, the STA 1 and the STA 2 are to-be-scheduled station s, and the Scheduled STAs field may include device identifier information of the STA 1 and the STA 2.

In an optional implementation, the allocation information of the available channels may be indicated by using a Scheduled sub-channels field and a Random access sub-channels field, as shown in Table 1. The Scheduled sub-channels field includes the information about the used-for-scheduling channel allocated to each to-be-scheduled station. For example, in FIG. 2, a Scheduled STAs field indicates that the STA 1 and the STA 2 are to-be-scheduled station s. A Scheduled sub-channels field may indicate that the sub-channel 1 is allocated to the STA 1 and the sub-channel 2 is allocated to the STA 2. A Random access sub-channels field includes the information about the selectable random competition channel allocated to the non-to-be-scheduled station. For example, the Random access sub-channels field indicates that the other sub-channels 3 to 8 are used as random competition channels.

In another optional implementation, the allocation information of the available channels may be indicated by using a Scheduled sub-channels field and an Available sub-channels field, as shown in Table 2. That is, the control frame does not explicitly indicate a random competition channel. The selectable random competition channel is obtained by removing the used-for-scheduling channel from the available channels, that is, by removing a channel indicated by the Scheduled sub-channels field from channels indicated by the Available sub-channels field.

S54: The access point receives a request to send frame sent by each station according to the control frame.

Specifically, after each station, for example, a target station, receives the control frame, the target station first determines, according to the device indication information, whether the target station is the to-be-scheduled station. If the target station is the to-be-scheduled station, the target station determines a corresponding used-for-scheduling channel according to the allocation information of the available channels, and sends the request to send frame by using the determined used-for-scheduling channel.

If the target station is not the to-be-scheduled station, the target station selects at least one idle channel or idle sub-channel from the random competition channel according to the allocation information of the available channels, and sends the request to send frame by using the selected idle channel or idle sub-channel.

S55: The access point performs resource scheduling on each station according to the received request to send frame.

Specifically, a scheduling policy may be flexibly adjusted according to a status of the received request to send frames and an idleness status of a sub-channel. It is assumed that the status of the request to send frames received by the access point is shown in FIG. 2. Because request to send frames sent by the STA 4 and the STA 5 collide, the access point cannot normally receive the corresponding request to send frames. As a result, the access point determines that the STA 4 and the STA 5 have no cached data, and allocates the sub-channel to another station. As shown in FIG. 2, the access point uses a clear to send frame to instruct the STA 1 to transmit Data 1 on the sub-channel 1 and the sub-channel 2, instruct the STA 2 to transmit Data 2 on the sub-channel 3 and the sub-channel 4, instruct the STA 3 to transmit Data 3 on the sub-channel 5 and the sub-channel 6, and instruct the STA 5 to transmit Data 5 on the sub-channel 7 and the sub-channel 8.

It should be noted that a specific sending format of the CTS (for example, to send the CTS by using an entire bandwidth or a sub-channel) does not belong to the present embodiments and is not limited. Any other implementation is applicable to this embodiment of the present embodiments.

It can be understood that this embodiment provides only a case in which there are five STAs and eight sub-channels; in an actual case, there may be more STAs and sub-channels.

The access point may use multiple types of scheduling algorithms, which may be selected according to an actual need.

In the embodiment shown in FIG. 5, when an obtained available channel is a single channel, an access point may select a to-be-scheduled station from station s according to service priorities of the station s, allocate a part of sub-channels to the to-be-scheduled station as a used-for-scheduling channel, and use the other part of the sub-channels as a selectable random competition channel. This can not only meet an access requirement of a high-priority service but also avoid invalid feedbacks from a large quantity of station s, thereby improving system efficiency.

Figure 6:
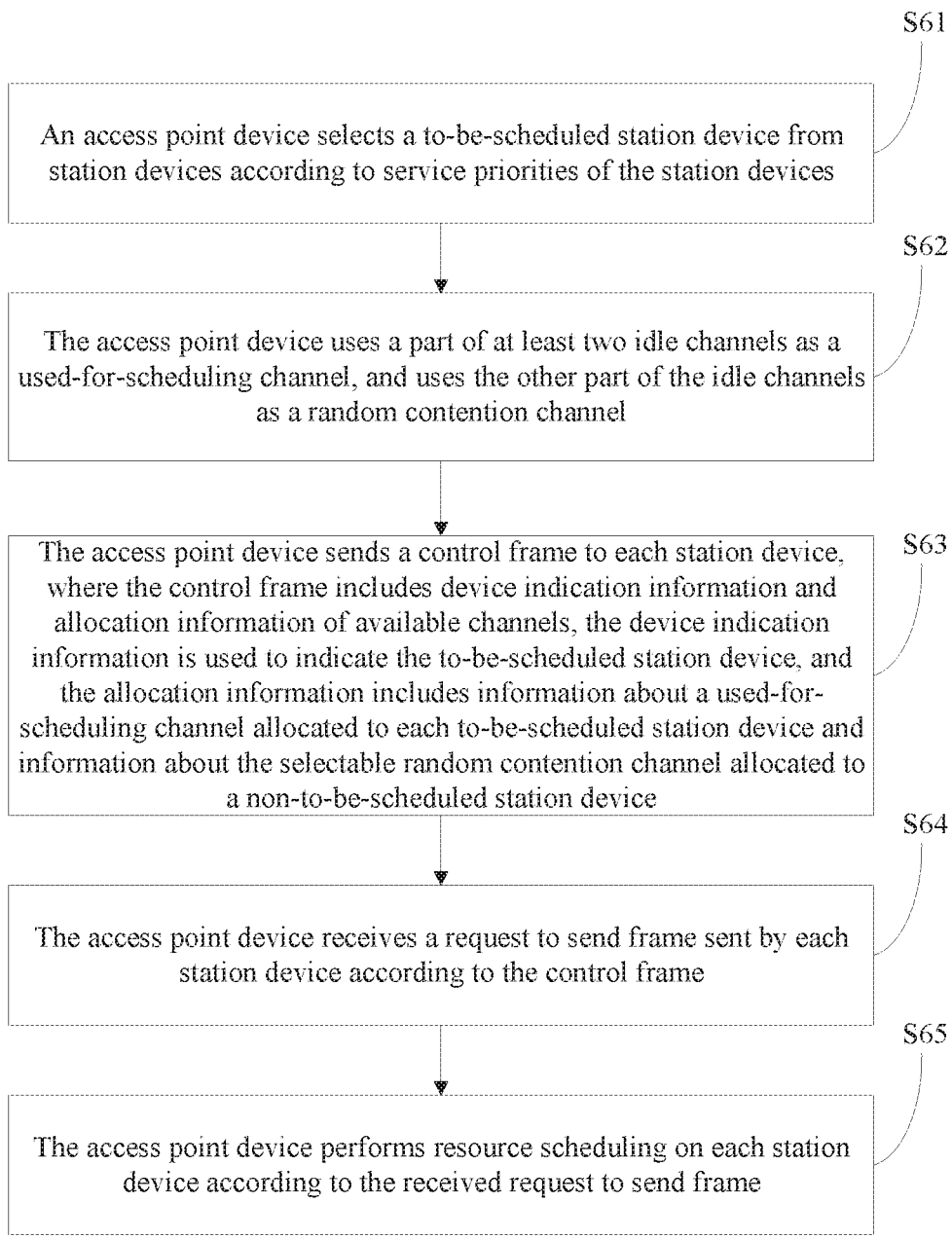
FIG. 6 is a schematic diagram of still another method for obtaining a request of a station according to an embodiment of the present invention.

Referring to FIG. 6, FIG. 6 is a schematic diagram of still another method for obtaining a request of a station according to an embodiment of the present invention. This embodiment of the present invention provides descriptions from a perspective of an access point. Available channels in this embodiment of the present invention include at least two idle channels. As shown in FIG. 6, the method for obtaining a request of a station in this embodiment of the present embodiments may include the following steps.

S61: The access point selects a to-be-scheduled station from station s according to service priorities of the station s.

It should be noted that, in this embodiment of the present invention, the access point selects the to-be-scheduled station according to the service priorities of the station s. In another optional embodiment, the to-be-scheduled station may be selected in another manner, which may be adjusted according to an actual application. This is not limited in the present embodiments.

S62: The access point uses a part of the at least two idle channels as a used-for-scheduling channel, and uses the other part of the idle channels as the random competition channel.

Further, if the available channels include one preset primary channel and at least one secondary channel, the access point may use the primary channel as the used-for-scheduling channel, and use the at least one secondary channel as the random competition channel.

Still further, each of the at least two idle channels may include multiple sub-channels. The access point may use all sub-channels of a part of the idle channels as the used-for-scheduling channels, and use all sub-channels of the other part of the idle channels as the random competition channels.

For example, there are two idle channels. It is assumed that one of the idle channels is a primary channel, and the other idle channel is a secondary channel. As shown in FIG. 3, each idle channel is divided into eight sub-channels. A STA 11 to a STA 18 are to-be-scheduled station s, and a STA 21 to a STA 26 are non-to-be-scheduled station s. The access point may use eight sub-channels of the primary channel as used-for-scheduling channels and allocate the eight sub-channels of the primary channel to the STA 11 to the STA 18 respectively, and use eight sub-channels of the secondary channel as selectable random competition channels.

S63: The access point sends a control frame to each station, where the control frame includes device indication information and allocation information of the available channels, the device indication information is used to indicate the to-be-scheduled station, and the allocation information includes information about a used-for-scheduling channel allocated to each to-be-scheduled station and information about a selectable random competition channel allocated to a non-to-be-scheduled station.

The device indication information may be represented by a Scheduled STAs field, and is used to indicate a to-be-scheduled station. For example, the STA 11 to the STA 18 are to-be-scheduled station s, and the Scheduled STAs field may include device identifier information of the STA 11 to the STA 18.

In an optional implementation, the allocation information of the available channels may be indicated by using a Scheduled sub-channels field and a Random access sub-channels field, as shown in Table 1. The Scheduled sub-channels field includes the information about the used-for-scheduling channel allocated to each to-be-scheduled station. For example, in FIG. 3, a Scheduled STAs field indicates that the STA 11 to the STA 18 are to-be-scheduled station s, and a Scheduled sub-channels field may indicate that all the sub-channels of the primary channel are allocated to the to-be-scheduled station s respectively. A Random access sub-channels field includes the information about the selectable random competition channel allocated to the non-to-be-scheduled station. For example, the Random access sub-channels field indicates that all the sub-channels of the secondary channel are used as random competition channels.

In another optional implementation, the allocation information of the available channels may be indicated by using a Scheduled sub-channels field and an Available sub-channels field, as shown in Table 2. That is, the control frame does not explicitly indicate a random competition channel. The selectable random competition channel is obtained by removing the used-for-scheduling channel from the available channels, that is, by removing a channel indicated by the Scheduled sub-channels field from channels indicated by the Available sub-channels field.

S64: The access point receives a request to send frame sent by each station according to the control frame.

Specifically, after each station, for example, a target station, receives the control frame, the target station first determines, according to the device indication information, whether the target station is the to-be-scheduled station. If the target station is the to-be-scheduled station, the target station determines a corresponding used-for-scheduling channel according to the allocation information of the available channels, and sends the request to send frame by using the determined used-for-scheduling channel.

If the target station is not the to-be-scheduled station, the target station selects at least one idle channel or idle sub-channel from the random competition channel according to the allocation information of the available channels, and sends the request to send frame by using the selected idle channel or idle sub-channel.

S65: The access point performs resource scheduling on each station according to the received request to send frame.

Specifically, a scheduling policy may be flexibly adjusted according to a status of the received request to send frames and an idleness status of a sub-channel. It is assumed that the status of the request to send frames received by the access point is shown in FIG. 3. Because station s corresponding to indications in request to send frames that are fed back on a sub-channel 3 and a sub-channel 6 of the primary channel have no cached data, and because data on a sub-channel 2 of the secondary channel collides with data on a sub-channel 6 of the secondary channel, the access point cannot normally receive corresponding request to send frames. Therefore, the access point may allocate the sub-channel 3 and the sub-channel 6 of the primary channel and the sub-channel 2 and the sub-channel 6 of the secondary channel to other station s. For specific allocation, refer to FIG. 3, and details are not described herein.

It should be noted that a specific sending format of the CTS (for example, to send the CTS by using an entire bandwidth or a sub-channel) does not belong to the present embodiments and is not limited. Any other implementation is applicable to this embodiment of the present invention.

It can be understood that this embodiment provides only a case in which there are 14 STAs and two idle channels. In an actual case, there may be more STAs and idle channels. The access point may use multiple types of scheduling algorithms, which may be selected according to an actual need.

In the embodiment shown in FIG. 6, when obtained available channels include at least two idle channels, an access point may select a to-be-scheduled station from station s according to service priorities of the stations, use a part of the at least two idle channels as a used-for-scheduling channel, and use the other part of the idle channels as a random competition channel. This can not only meet an access requirement of a high-priority service but also avoid invalid feedbacks from a large quantity of station s, thereby improving system efficiency.

Figure 7:
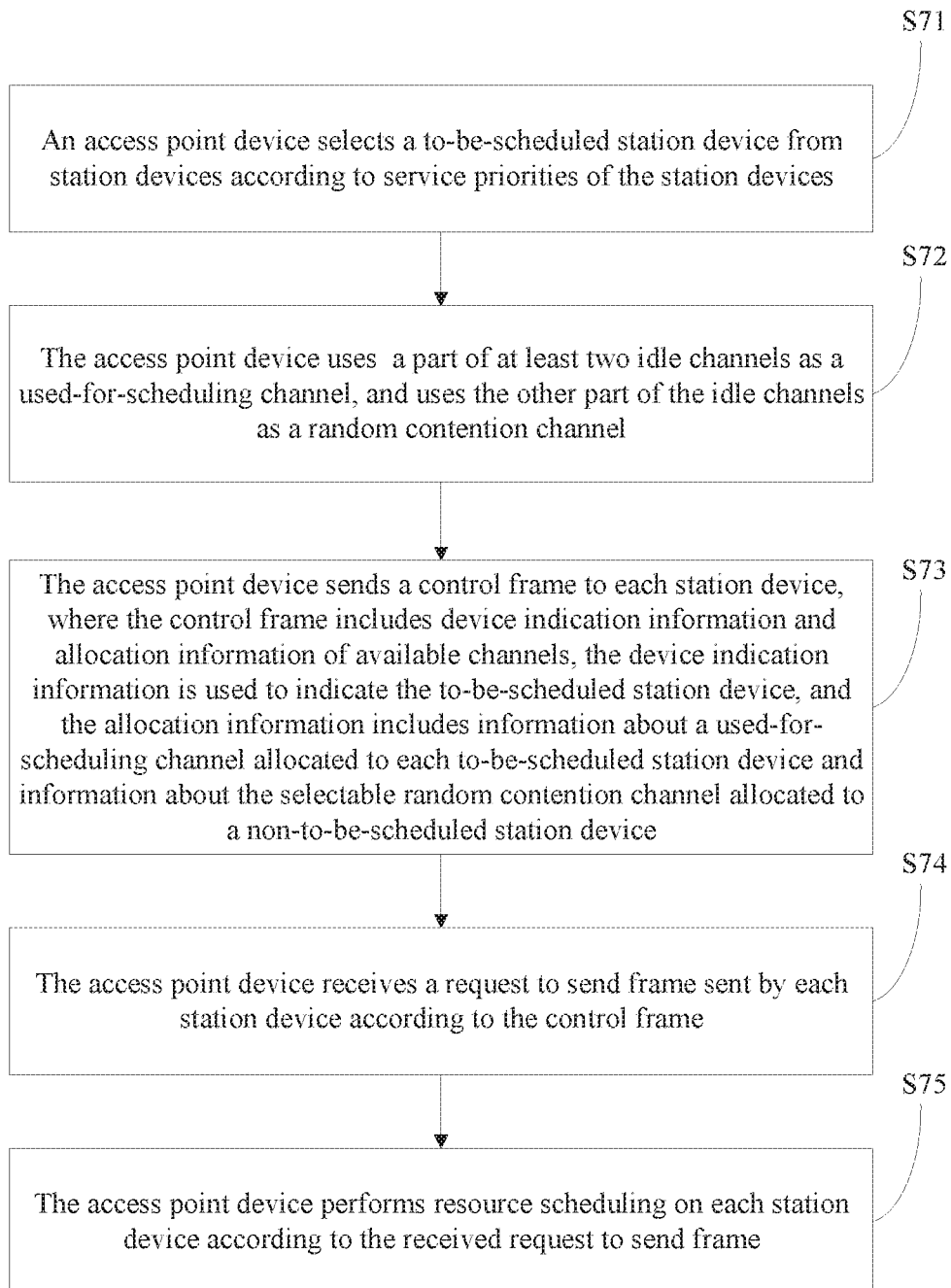
FIG. 7 is a schematic diagram of yet another method for obtaining a request of a station according to an embodiment of the present invention.

Referring to FIG. 7, FIG. 7 is a schematic diagram of yet another method for obtaining a request of a station according to an embodiment of the present invention. This embodiment of the present invention provides descriptions from a perspective of an access point. Available channels in this embodiment of the present invention include at least two idle channels. As shown in FIG. 7, the method for obtaining a request of a station in this embodiment of the present invention may include the following steps.

S71: The access point selects a to-be-scheduled station from station s according to service priorities of the station s.

It should be noted that, in this embodiment of the present invention, the access point selects the to-be-scheduled station according to the service priorities of the station s. In another optional embodiment, the to-be-scheduled station may be selected in another manner, which may be adjusted according to an actual application. This is not limited in the present embodiments.

S72: The access point uses a part of sub-channels of each idle channel as a used-for-scheduling channel and uses the other part of the sub-channels of each idle channel as a random competition channel.

For example, there are two idle channels. It is assumed that one of the idle channels is a primary channel, the other idle channel is a secondary channel, and each idle channel is divided into seven sub-channels; a STA 11, a STA 12, a STA 21, and a STA 22 are to-be-scheduled station s, and a STA 13 to a STA 16 and a STA 23 to a STA 26 are non-to-be-scheduled station s. In this case, the access point may allocate a used-for-scheduling channel in either of the following two manners.

In a first manner, locations of used-for-scheduling sub-channels on each idle channel are the same. As shown in FIG. 4, the access point allocates a sub-channel 1 and a sub-channel 2 of the primary channel to the to-be-scheduled stations the STA 11 and the STA 12, and similarly, allocates a sub-channel 1 and a sub-channel 2 of the secondary channel to the to-be-scheduled stations the STA 21 and the STA 22; the other sub-channels are used as the random competition channels.

In a second manner, locations of used-for-scheduling sub-channels on each idle channel are different. For example, the access point allocates a sub-channel 1 and a sub-channel 2 of the primary channel to the to-be-scheduled stations the STA 11 and the STA 12, and allocates a sub-channel 3 and a sub-channel 4 of the secondary channel to the to-be-scheduled stations the STA 21 and the STA 22; the other sub-channels are used as the random competition channels.

S73: The access point sends a control frame to each station, where the control frame includes device indication information and allocation information of the available channels, the device indication information is used to indicate the to-be-scheduled station, and the allocation information includes information about a used-for-scheduling channel allocated to each to-be-scheduled station and information about a selectable random competition channel allocated to a non-to-be-scheduled station.

The device indication information may be represented by a Scheduled STAs field, and is used to indicate a to-be-scheduled station. For example, the STA 11, the STA 12, the STA 21, and the STA 22 are to-be-scheduled station s, and the Scheduled STAs field may include device identifier information of the STA 11, the STA 12, the STA 21, and the STA 22.

In an optional implementation, locations of used-for-scheduling sub-channels on each idle channel are the same, and the allocation information of the available channels may be indicated by using an Available sub-channels field and a Position of scheduled sub-channels field, as shown in Table 3. The Available sub-channels field is used to indicate all idle channels in the available channels, and the Position of Scheduled sub-channels field is used to indicate the locations of the used-for-scheduling sub-channels on each idle channel. As shown in FIG. 4, the Position of scheduled sub-channels field indicates that a sub-channel 1 and a sub-channel 2 of each idle channel are allocated to to-be-scheduled station s.

TABLE 3

| Frame control | RA | TA | Available sub-channels | Position of Scheduled sub-channels | Scheduled STAs | FCS |
|---|---|---|---|---|---|---|

In another optional implementation, locations of used-for-scheduling sub-channels on each idle channel are different, and the allocation information of the available channels may be indicated by using a combination of multiple Available sub-channels fields and Position of Scheduled sub-channels fields. As shown in Table 4, for example, Available Channel 1, Scheduled sub-channels in channel 1, and Scheduled STAs field in channel 1 are used to indicate that a sub-channel 1 of the primary channel is allocated to the STA 1.

TABLE 4

| Frame control | RA | TA | Available Channel 1 | Scheduled sub-channels in channel 1 | Scheduled STAs in channel 1 | ... | Available Channel n | Scheduled sub-channels in channel n | Scheduled STAs in channel n | FCS |
|---|---|---|---|---|---|---|---|---|---|---|

S74: The access point receives a request to send frame sent by each station according to the control frame.

Specifically, after each station, for example, a target station, receives the control frame, the target station first determines, according to the device indication information, whether the target station is the to-be-scheduled station. If the target station is the to-be-scheduled station, the target station determines a corresponding used-for-scheduling channel according to the allocation information of the available channels, and sends the request to send frame by using the determined used-for-scheduling channel.

If the target station is not the to-be-scheduled station, the target station selects at least one idle channel or idle sub-channel from the random competition channel according to the allocation information of the available channels, and sends the request to send frame by using the selected idle channel or idle sub-channel.

S75: The access point performs resource scheduling on each station according to the received request to send frame.

Specifically, a scheduling policy may be flexibly adjusted according to a status of the received request to send frames and an idleness status of a sub-channel. It is assumed that the status of the request to send frames received by the access point is shown in FIG. 4. Because request to send frames sent by a STA 14, a STA 15, a STA 25, and a STA 26 collide, the access point cannot normally receive the corresponding request to send frames. As a result, the access point determines that the STA 14, the STA 15, the STA 25, and the STA 26 have no cached data, and allocates the sub-channel to another station. For specific allocation, refer to FIG. 4, and details are not described herein.

It should be noted that a specific sending format of the CTS (for example, to send the CTS by using an entire bandwidth or a sub-channel) does not belong to the present embodiments and is not limited. Any other implementation is applicable to this embodiment of the present invention.

In the embodiment shown in FIG. 7, when obtained available channels include at least two idle channels, an access point may select a to-be-scheduled station from station s according to service priorities of the station s, use a part of sub-channels of each idle channel as a used-for-scheduling channels and allocate them to the to-be-scheduled stations, and use the other part of the sub-channels of each idle channel as a random competition channels. This can not only meet an access requirement of a high-priority service but also avoid invalid feedbacks from a large quantity of station s, thereby improving system efficiency.

Figure 8:
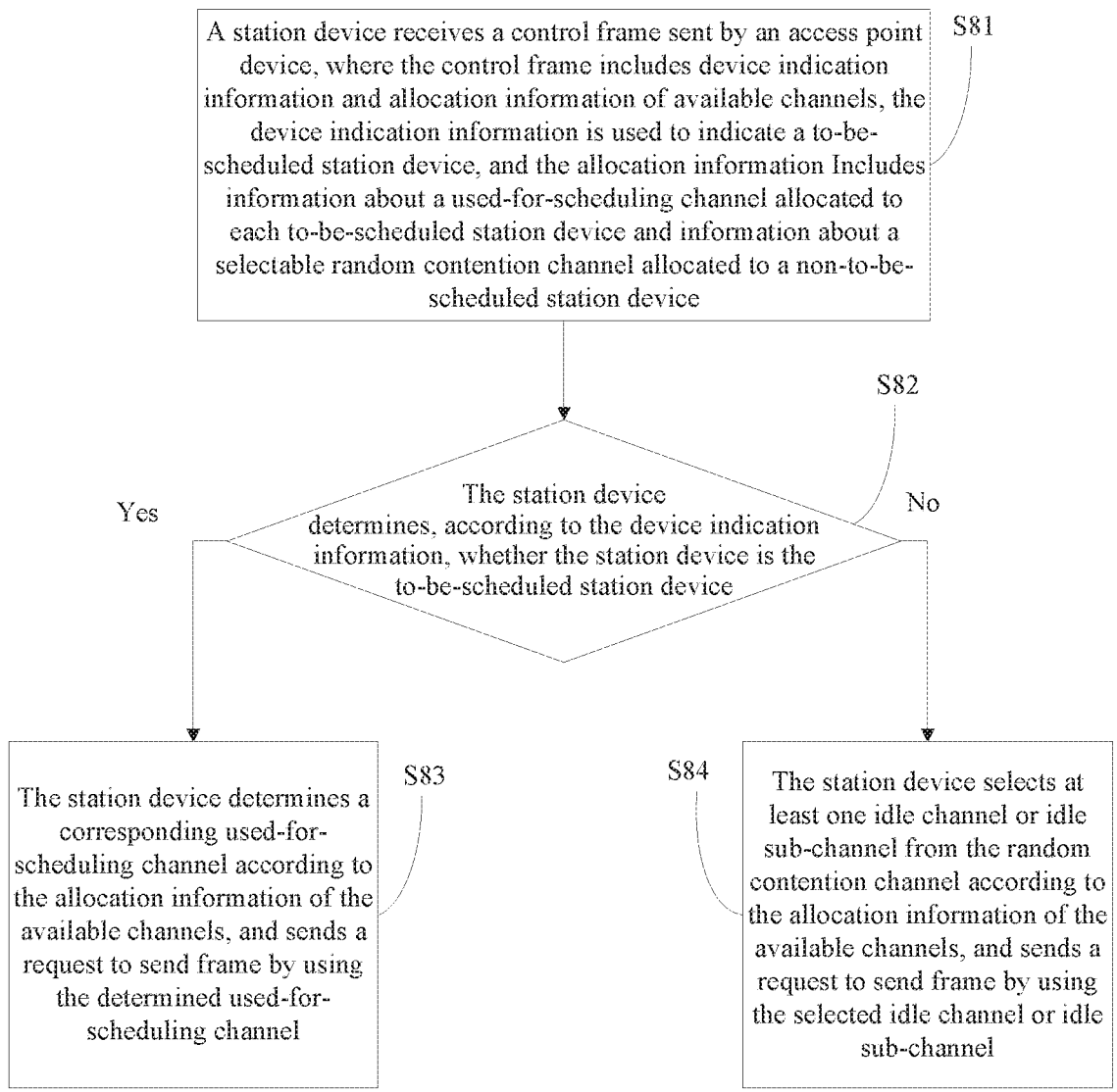
FIG. 8 is a schematic diagram of still yet another method for obtaining a request of a station according to an embodiment of the present invention.

Referring to FIG. 8, FIG. 8 is a schematic diagram of still yet another method for obtaining a request of a station according to an embodiment of the present invention. This embodiment of the present invention provides descriptions from a perspective of a station. As shown in FIG. 8, the method for obtaining a request of a station in this embodiment of the present invention may include the following steps.

S81: The station receives a control frame sent by an access point, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station.

The station obtains, by means of snooping, the control frame sent by the access point. The information about the selectable random competition channel is used to indicate the selectable random competition channel. The selectable random competition channel may be obtained by removing the used-for-scheduling channel from the available channels.

S82: The station determines, according to the device indication information, whether the station is the to-be-scheduled station.

Assuming that the control frame received by the station is shown in Table 1, the station may determine, according to a Scheduled STAs field, whether the station is the to-be-scheduled station.

Specifically, the Scheduled STAs field may include identifier information of the to-be-scheduled station. If the identifier information includes identifier information of the station, the station may determine that the station is the to-be-scheduled station.

S83: If yes, the station determines a corresponding used-for-scheduling channel according to the allocation information of the available channels, and sends a request to send frame by using the determined used-for-scheduling channel.

It is assumed that the control frame, received by the station, shown in Table 1 is still used as an example. When the station determines, according to the Scheduled STAs field, that the station is the to-be-scheduled station, the station may determine, according to a Scheduled sub-channels field, a used-for-scheduling channel allocated by the access point to the station, and then send the request to send frame by using the determined used-for-scheduling channel.

Further, if the station is the to-be-scheduled station, the station may further detect whether cached data exists on the station. The station sends the request to send frame by using the determined used-for-scheduling channel only if cached data exists on the station.

Still further, the station starts waiting upon receiving the control frame, and sends the request to send frame only when waiting duration is equal to preset duration. For example, the preset duration is t, and the station may start timing upon receiving the control frame. After the station determines the corresponding used-for-scheduling channel, the station may further detect whether the waiting duration reaches t. If no, the station does not send the request to send frame until the waiting duration is equal to t.

The preset duration is may be duration specified by the access point.

S84: If no, the station selects at least one idle channel or idle sub-channel from the random competition channel according to the allocation information of the available channels, and sends the request to send frame by using the selected idle channel or idle sub-channel.

If the station is not the to-be-scheduled station, the station may select at least one idle channel or idle sub-channel from the random competition channel according to the allocation information of the available channels, and the station sends the request to send frame by using the selected idle channel or idle sub-channel.

If a format of the control frame received by the station is shown in Table 1, that is, the allocation information of the available channels is indicated by using the Scheduled sub-channels field and a Random access sub-channels field, the station may obtain the selectable random competition channel according to the Random access sub-channels field, so as to select the at least one idle channel or idle sub-channel from the random competition channel.

If a format of the control frame received by the station is shown in Table 2, that is, the allocation information of the available channels is indicated by using a Scheduled sub-channels field and an Available sub-channels field, the station may obtain the selectable random competition channel by removing a channel indicated by the Scheduled sub-channels field from channels indicated by the Available sub-channels field, so as to select the at least one idle channel or idle sub-channel from the random competition channel.

If a format of the control frame received by the station is shown in Table 3 or Table 4, that is, the allocation information of the available channels is indicated by using an Available sub-channels field and a Position of Scheduled sub-channels field, the station may determine locations of used-for-scheduling channels on each idle channel according to the Position of Scheduled sub-channels field, then remove the used-for-scheduling channels at the corresponding locations on each idle channel, and obtain the selectable random competition channel, so as to select the at least one idle channel or idle sub-channel from the random competition channel.

Further, the device indication information is further used to indicate the non-to-be-scheduled station. If the station is not the to-be-scheduled station, the station may further determine, according to the device indication information, whether the station is the non-to-be-scheduled station. If yes, the station selects the at least one idle channel or idle sub-channel from the random competition channel. Otherwise, the station does not send the request to send frame.

In the embodiment shown in FIG. 8, a station may receive a control frame sent by an access point, and determine, according to device indication information in the control frame, whether the station is a to-be-scheduled station; if yes, the station determines a used-for-scheduling channel; otherwise, the station selects at least one idle channel or idle sub-channel from a random competition channel. This can not only meet an access requirement of a high-priority service but also avoid invalid feedbacks from a large quantity of station s, thereby improving system efficiency.

Figure 9:
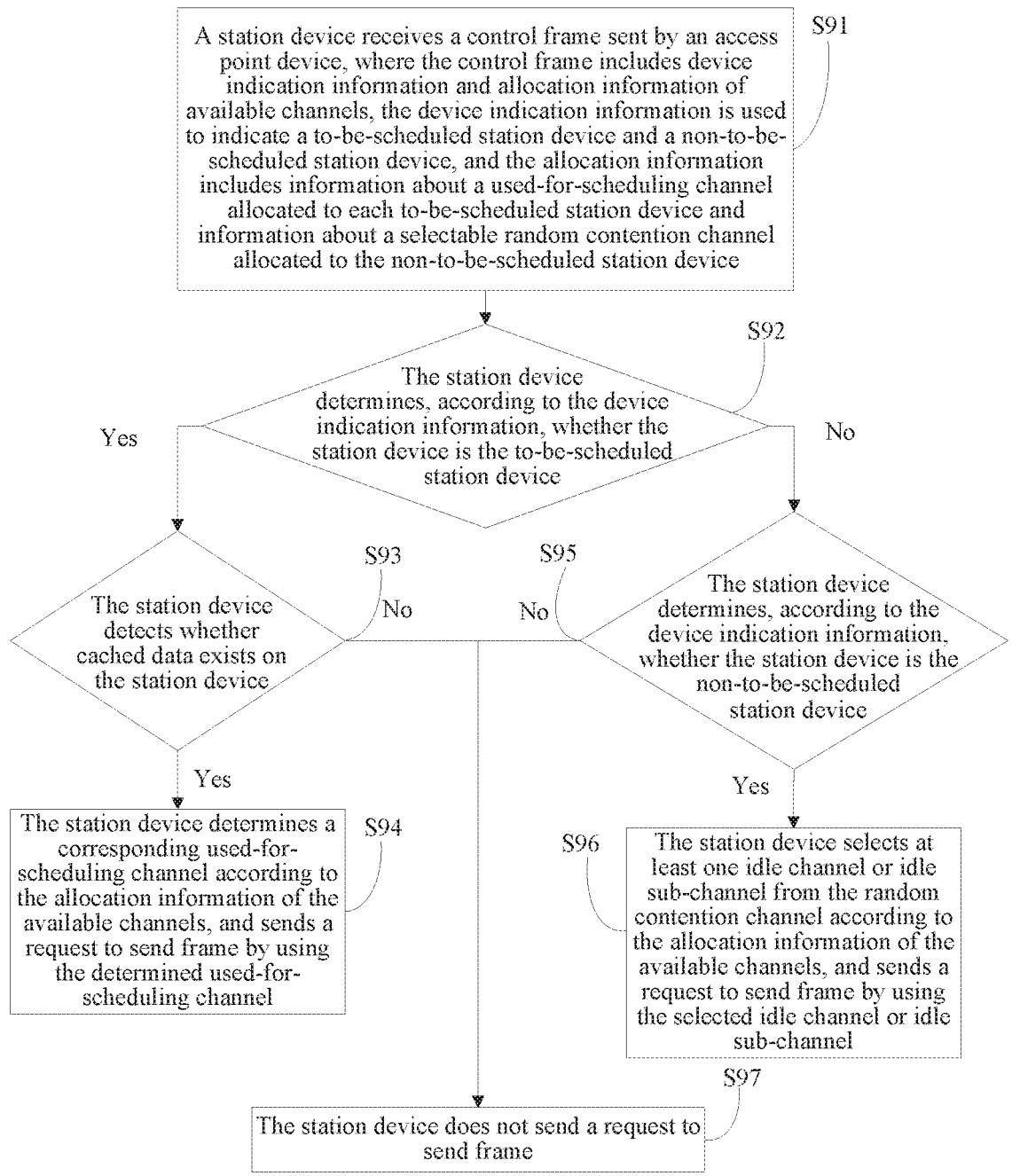
FIG. 9 is a schematic diagram of a further method for obtaining a request of a station according to an embodiment of the present invention.

Referring to FIG. 9, FIG. 9 is a schematic diagram of a further method for obtaining a request of a station according to an embodiment of the present invention. This embodiment of the present invention provides descriptions from a perspective of a station. As shown in FIG. 9, the method for obtaining a request of a station in this embodiment of the present invention may include the following steps.

S91: The station receives a control frame sent by an access point, where the control frame includes device indication information and allocation information of available channels, the device indication information is used to indicate a to-be-scheduled station and a non-to-be-scheduled station, and the allocation information includes information about a used-for-scheduling channel allocated to each to-be-scheduled station and information about a selectable random competition channel allocated to the non-to-be-scheduled station.

The station obtains, by means of snooping, the control frame sent by the access point. The information about the selectable random competition channel is used to indicate the selectable random competition channel. The selectable random competition channel may be obtained by removing the used-for-scheduling channel from the available channels.

S92: The station determines, according to the device indication information, whether the station is the to-be-scheduled station.

Assuming that the control frame received by the station is shown in Table 1, the station may determine, according to a Scheduled STAs field, whether the station is the to-be-scheduled station.

Specifically, the Scheduled STAs field may include identifier information of the to-be-scheduled station. If the identifier information includes identifier information of the station, the station may determine that the station is the to-be-scheduled station.

S93: If the station is the to-be-scheduled station, the station detects whether cached data exists on the station.

S94: If cached data exists on the station, the station determines a corresponding used-for-scheduling channel according to the allocation information of the available channels, and sends a request to send frame by using the determined used-for-scheduling channel.

It is assumed that the control frame, received by the station, shown in Table 1 is still used as an example. If the station detects that cached data exists, the station may determine, according to a Scheduled sub-channels field, a used-for-scheduling channel allocated by the access point to the station, and then send the request to send frame by using the determined used-for-scheduling channel.

Further, the station starts waiting upon receiving the control frame, and sends the request to send frame only when waiting duration is equal to preset duration. For example, the waiting duration is t, and the station may start timing upon receiving the control frame. After the station determines the corresponding used-for-scheduling channel, the station may further detect whether the waiting duration reaches t. If no, the station does not send the request to send frame until the waiting duration is equal to t.

S95: If the station is not the to-be-scheduled station, the station determines, according to the device indication information, whether the station is the non-to-be-scheduled station.

A format of the control frame may be shown in Table 5. The device indication information may include a Scheduled STAs field and a Non-Scheduled STAs field. The Non-Scheduled STAs field is used to indicate the non-to-be-scheduled station. When the station determines, according to the Scheduled STAs field, that the station is not the to-be-scheduled station, the station may determine, according to the Non-Scheduled STAs field, whether the station is the non-to-be-scheduled station.

TABLE 5

| Frame control | RA | TA | Scheduled sub-channels | Scheduled STAs | Non-Scheduled STAs | Random access sub-channels | FCS |
|---|---|---|---|---|---|---|---|

S96: If the station is the non-to-be-scheduled station, the station selects at least one idle channel or idle sub-channel from the random competition channel according to the allocation information of the available channels, and sends a request to send frame by using the selected idle channel or idle sub-channel.

If a format of the control frame received by the station is shown in Table 1, that is, the allocation information of the available channels is indicated by using the Scheduled sub-channels field and a Random access sub-channels field, the station may obtain the selectable random competition channel according to the Random access sub-channels field, so as to select the at least one idle channel or idle sub-channel from the random competition channel.

If a format of the control frame received by the station is shown in Table 2, that is, the allocation information of the available channels is indicated by using a Scheduled sub-channels field and an Available sub-channels field, the station may obtain the selectable random competition channel by removing a channel indicated by the Scheduled sub-channels field from channels indicated by the Available sub-channels field, so as to select the at least one idle channel or idle sub-channel from the random competition channel.

If a format of the control frame received by the station is shown in Table 3 or Table 4, that is, the allocation information of the available channels is indicated by using an Available sub-channels field and a Position of Scheduled sub-channels field, the station may determine locations of used-for-scheduling channels on each idle channel according to the Position of Scheduled sub-channels field, then remove the used-for-scheduling channels at the corresponding locations on each idle channel, and obtain the selectable random competition channel, so as to select the at least one idle channel or idle sub-channel from the random competition channel.

Further, the station starts waiting upon receiving the control frame, and sends the request to send frame only when waiting duration is equal to preset duration. For example, the waiting duration is t, and the station may start timing upon receiving the control frame. After the station selects the at least one idle channel or idle sub-channel from the random competition channel, the station may further detect whether the waiting duration reaches t. If no, the station does not send the request to send frame until the waiting duration is equal to t.

S97: If cached data does not exist on the station or the station is not the non-to-be-scheduled station, the station does not send a request to send frame.

In the embodiment shown in FIG. 9, a station may determine, according to device indication information in a control frame, whether the station is a to-be-scheduled station. If yes, the station determines a used-for-scheduling channel. If no, the station further determines whether the station is a non-to-be-scheduled station. If yes, the station selects at least one idle channel or idle sub-channel from a random competition channel. An access point controls a quantity of station s that access a channel, so as to control a probability of data collision. In this way, system efficiency is improved.

Figure 10:
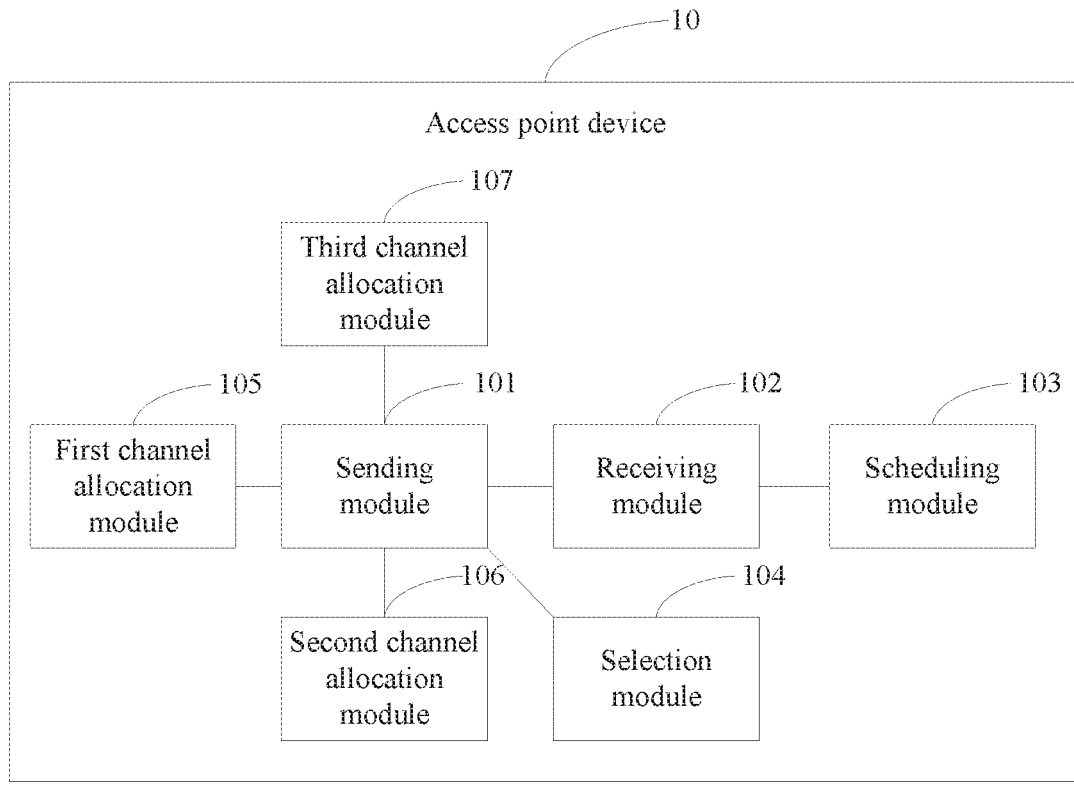
FIG. 10 is a schematic structural diagram of an access point according to an embodiment of the present invention.

Referring to FIG. 10, FIG. 10 is a schematic structural diagram of an access point according to an embodiment of the present invention. As shown in FIG. 10, the access point 10 in this embodiment of the present invention may include at least a sending module 101, a receiving module 102, and a scheduling module 103.

The sending module 101 is configured to send a control frame to a station. The control frame includes device indication information and allocation information of available channels. The device indication information is used to indicate a to-be-scheduled station. The allocation information includes information about a used-for-scheduling channel allocated to each to-be-scheduled station and information about a selectable random competition channel allocated to a non-to-be-scheduled station.

The available channels may be continuous channels, or may be discrete channels. This is not limited in the present embodiments.

Optionally, the non-to-be-scheduled station may include a station in a basic service set except the to-be-scheduled station indicated by the device indication information. It is assumed that the basic service set includes a STA 1, a STA 2, a STA 3, a STA 4, and a STA 5, and the device indication information indicates that the STA 1 and the STA 2 are to-be-scheduled station s. In this case, the STA 3, the STA 4, and the STA 5 are non-to-be-scheduled station s. That is, the STA 3, the STA 4, and the STA 5 can access a channel by means of random competition.

Further, the device indication information is further used to indicate the non-to-be-scheduled station, and the non-to-be-scheduled station is determined according to the device indication information. It is assumed that the basic service set still includes the STA 1, the STA 2, the STA 3, the STA 4, and the STA 5, and the device indication information indicates that the STA 1 and the STA 2 are the to-be-scheduled station s and the STA 3 and the STA 4 are the non-to-be-scheduled station s. That is, the STA 5 cannot access a channel. A probability of data collision can be effectively controlled by controlling a quantity of station s that participate in random competition. In this way, system efficiency is further improved.

Optionally, the access point 10 may further include a selection module 104, configured to select the to-be-scheduled station from the station s according to service priorities of the station s.

Further, the information about the selectable random competition channel is used to indicate the selectable random competition channel. The selectable random competition channel is obtained by removing the used-for-scheduling channel from the available channels.

If the available channels include one idle channel, the access point 10 may further include a first channel allocation module 105, configured to use a part of sub-channels of the idle channel as the used-for-scheduling channel and use the other part of the sub-channels of the idle channel as the random competition channel.

As shown in FIG. 2, it is assumed that the idle channel is divided into eight sub-channels, a STA 1 and a STA 2 are to-be-scheduled station s, and a STA 3 to a STA 6 are non-to-be-scheduled station s. The first channel allocation module 105 may use a sub-channel 1 as a used-for-scheduling channel and allocate the sub-channel 1 to the STA 1, use a sub-channel 2 as a used-for-scheduling channel and allocate the sub-channel 2 to the STA 2, and use the other sub-channels 3 to 8 as selectable random competition channels.

If the available channels include at least two idle channels, the access point 10 may further include a second channel allocation module 106, configured to use a part of the at least two idle channels as the used-for-scheduling channel and use the other part of the idle channels as the random competition channel.

Further, if the available channels include one preset primary channel and at least one secondary channel, the second channel allocation module 106 may be specifically configured to use the primary channel as the used-for-scheduling channel, and use the at least one secondary channel as the random competition channel.

Still further, each of the at least two idle channels may include multiple sub-channels. The second channel allocation module 106 may use all sub-channels of a part of the idle channels as the used-for-scheduling channels, and use all sub-channels of the other part of the idle channels as the random competition channels.

For example, there are two idle channels. It is assumed that one of the idle channels is a primary channel, and the other idle channel is a secondary channel. As shown in FIG. 3, each idle channel is divided into eight sub-channels, a STA 11 to a STA 18 are to-be-scheduled station s, and a STA 21 to a STA 27 are non-to-be-scheduled station s. The second channel allocation module 106 may use eight sub-channels of the primary channel as used-for-scheduling channels and allocate the eight sub-channels of the primary channel to the STA 11 to the STA 18 respectively, and use eight sub-channels of the secondary channel as selectable random competition channels.

If the available channels include at least two idle channels, the access point 10 may further include a third channel allocation module 107, configured to use a part of sub-channels of each idle channel as the used-for-scheduling channel and use the other part of the sub-channels of each idle channel as the random competition channel.

Still for example, there are two idle channels. It is assumed that one of the idle channels is a primary channel, the other idle channel is a secondary channel, and each idle channel is divided into eight sub-channels; a STA 11, a STA 12, a STA 21, and a STA 22 are to-be-scheduled station s, and a STA 13 to a STA 16 and a STA 23 to a STA 26 are non-to-be-scheduled station s. The third channel allocation module 107 may allocate a used-for-scheduling channel in either of the following two manners.

In a first manner, locations of used-for-scheduling sub-channels on each idle channel are the same. As shown in FIG. 4, the third channel allocation module 107 allocates a sub-channel 1 and a sub-channel 2 of the primary channel to the to-be-scheduled stations the STA 11 and the STA 12, and similarly, allocates a sub-channel 1 and a sub-channel 2 of the secondary channel to the to-be-scheduled stations the STA 21 and the STA 22; the other sub-channels are used as the random competition channels.

In a second manner, locations of used-for-scheduling sub-channels on each idle channel are different. For example, the third channel allocation module 107 allocates a sub-channel 1 and a sub-channel 2 of the primary channel to the to-be-scheduled stations the STA 11 and the STA 12, and allocates a sub-channel 3 and a sub-channel 4 of the secondary channel to the to-be-scheduled stations the STA 21 and the STA 22; the other sub-channels are used as the random competition channels.

The receiving module 102 is configured to receive a request to send frame sent by each station according to the control frame.

The scheduling module 103 is configured to perform resource scheduling on each station according to the received request to send frame.

It can be understood that a function of each function module of the access point 10 in this embodiment can be specifically implemented according to the methods in the foregoing method embodiments. For specific descriptions, correspondingly refer to related descriptions of the method embodiments in FIG. 1 to FIG. 7, and details are not described herein again.

Figure 11:
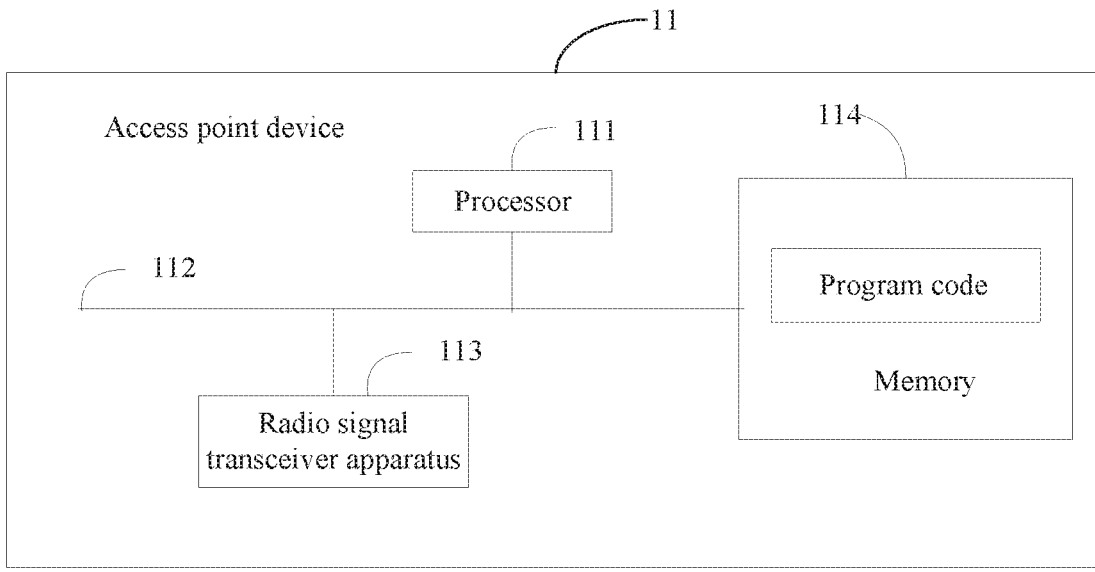
FIG. 11 is a schematic structural diagram of another access point according to an embodiment of the present invention.

Referring to FIG. 11, FIG. 11 is a schematic structural diagram of another access point according to an embodiment of the present invention. As shown in FIG. 11, the access point 11 may include at least one processor 111, for example, a CPU, at least one communications bus 112, a radio signal transceiver apparatus 113, and a memory 114. The radio signal transceiver apparatus 113 is configured to receive and send a signal, such as a control frame or a clear to send frame. The communications bus 112 is configured to implement connection and communication among these components. The memory 114 may be a high-speed, or may be a non-volatile memory (non-volatile memory), for example, at least one magnetic disk memory. The memory 114 stores a set of program code. The processor 111 is configured to invoke the program code stored in the memory 114, to perform the following operations: sending a control frame to a station by using the radio signal transceiver apparatus 113, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station; receiving, by using the radio signal transceiver apparatus 113, a request to send frame sent by each station according to the control frame; and performing resource scheduling on each station according to the received request to send frame.

If the available channels include one idle channel, the processor 111 may further perform the following operation before sending the control frame to the station by using the radio signal transceiver apparatus 113: using a part of sub-channels of the idle channel as the used-for-scheduling channel, and using the other part of the sub-channels of the idle channel as the random competition channel.

If the available channels include at least two idle channels, the processor 111 may further perform the following operation before sending the control frame to the station by using the radio signal transceiver apparatus 113: using a part of the at least two idle channels as the used-for-scheduling channel, and using the other part of the idle channels as the random competition channel.

If the available channels include one preset primary channel and at least one secondary channel, the using, by the processor 111, a part of the at least two idle channels as the used-for-scheduling channel, and using the other part of the idle channels as the random competition channel may be specifically: using the primary channel as the used-for-scheduling channel, and using the at least one secondary channel as the random competition channel.

If the available channels include at least two idle channels, the processor 111 may further perform the following operation before sending the control frame to the station by using the radio signal transceiver apparatus 113: using a part of sub-channels of each idle channel as the used-for-scheduling channel, and using the other part of the sub-channels of each idle channel as the random competition channel.

Optionally, the device indication information is further used to indicate the non-to-be-scheduled station.

Optionally, the processor 111 may further perform the following operation before sending the control frame to the station by using the radio signal transceiver apparatus 113: selecting the to-be-scheduled station from the station s according to service priorities of the station s.

Further, the information about the selectable random competition channel is used to indicate the selectable random competition channel. The selectable random competition channel is obtained by removing the used-for-scheduling channel from the available channels.

It can be understood that a function of each function module of the access point 11 in this embodiment can be specifically implemented according to the methods in the foregoing method embodiments. For specific descriptions, correspondingly refer to related descriptions of the method embodiments in FIG. 1 to FIG. 7, and details are not described herein again.

Figure 12:
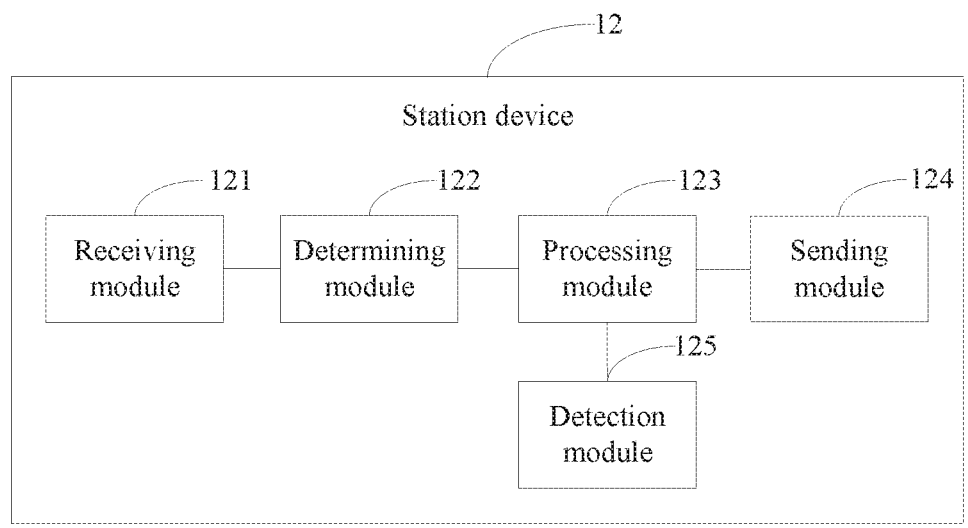
FIG. 12 is a schematic structural diagram of a station according to an embodiment of the present invention.

Referring to FIG. 12, FIG. 12 is a schematic structural diagram of a station according to an embodiment of the present invention. As shown in FIG. 12, the station 12 in this embodiment of the present invention may include at least a receiving module 121, a determining module 122, a processing module 123, and a sending module 124.

The receiving module 121 is configured to receive a control frame sent by an access point, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station.

The determining module 122 is configured to determine, according to the device indication information, whether the station is the to-be-scheduled station.

The processing module 123 is configured to determine a corresponding used-for-scheduling channel according to the allocation information of the available channels if the determining module 122 determines that the station is the to-be-scheduled station.

The sending module 124 is configured to send a request to send frame by using the determined used-for-scheduling channel, so that the access point performs resource scheduling on the station according to the request to send frame.

The processing module 123 is further configured to: select at least one idle channel or idle sub-channel from the random competition channel according to the allocation information of the available channels if the determining module 122 determines that the station is not the to-be-scheduled station.

The sending module 124 is further configured to send a request to send frame by using the selected idle channel or idle sub-channel.

Further, the station 12 may further include a detection module 125, configured to: if the determining module 122 determines that the station is the to-be-scheduled station, detect whether cached data exists on the station; and if it is detected that cached data exists, trigger the processing module 123 to determine the corresponding used-for-scheduling channel according to the allocation information of the available channels.

Still further, the device indication information is further used to indicate the non-to-be-scheduled station. If the station is not the to-be-scheduled station, the determining module 122 is further configured to: determine, according to the device indication information, whether the station is the non-to-be-scheduled station, and if it is determined that the station is the non-to-be-scheduled station, trigger the processing module 123 to select the at least one idle channel or idle sub-channel from the random competition channel.

Yet further, the sending module 124 is further configured to start waiting when the receiving module 121 receives the control frame, and send, by using the determined used-for-scheduling channel, the request to send frame only when waiting duration is equal to preset duration.

It can be understood that a function of each function module of the access point 12 in this embodiment can be specifically implemented according to the methods in the foregoing method embodiments. For specific descriptions, correspondingly refer to related descriptions of the method embodiments in FIG. 8 and FIG. 9, and details are not described herein again.

Figure 13:
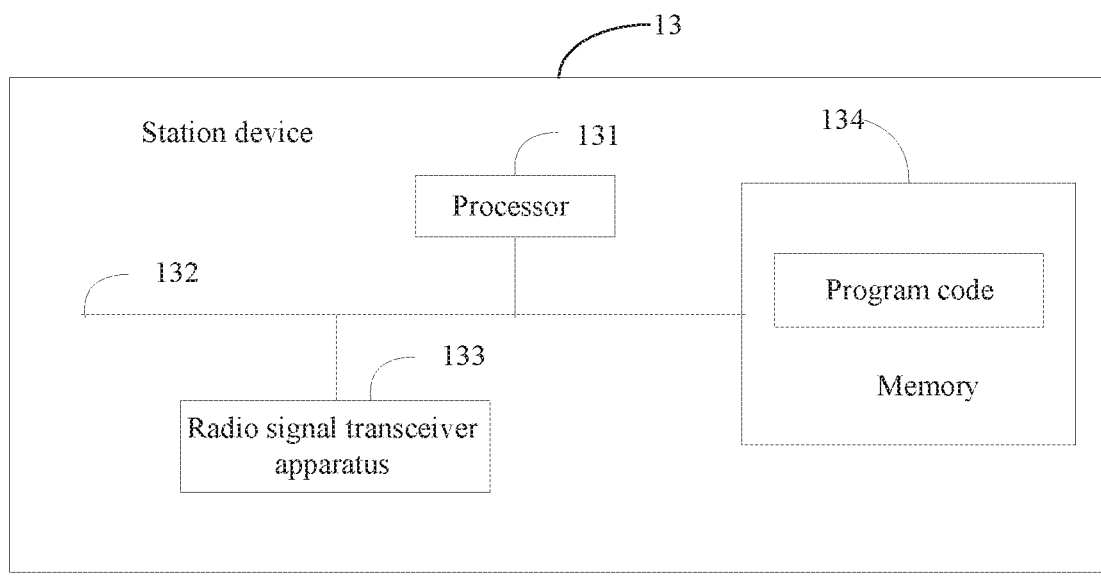
FIG. 13 is a schematic structural diagram of another station according to an embodiment of the present invention.

Referring to FIG. 13, FIG. 13 is a schematic structural diagram of another station according to an embodiment of the present invention. As shown in FIG. 13, the station 13 may include at least one processor 131, for example, a CPU, at least one communications bus 132, a radio signal transceiver apparatus 133, and a memory 134. The radio signal transceiver apparatus 133 is configured to receive and send a signal, such as a control frame or a request to send frame.

The communications bus 132 is configured to implement connection and communication among these components. The memory 134 may be a high-speed, or may be a non-volatile memory (non-volatile memory), for example, at least one magnetic disk memory. The memory 134 stores a set of program code. The processor 131 is configured to invoke the program code stored in the memory 134, to perform the following operations: receiving, by using the radio signal transceiver apparatus 133, a control frame sent by an access point, where the control frame includes device indication information and allocation information of available channels, the device indication information is used to indicate a to-be-scheduled station, and the allocation information includes information about a used-for-scheduling channel allocated to each to-be-scheduled station and information about a selectable random competition channel allocated to a non-to-be-scheduled station; determining, according to the device indication information, whether the station is the to-be-scheduled station; and if yes, determining, by the station, a corresponding used-for-scheduling channel according to the allocation information of the available channels, and sending a request to send frame by using the determined used-for-scheduling channel; or if no, selecting at least one idle channel or idle sub-channel from the random competition channel according to the allocation information of the available channels, and sending a request to send frame by using the selected idle channel or idle sub-channel.

Further, if the station is the to-be-scheduled station, the processor 131 may further perform the following operation before determining the corresponding used-for-scheduling channel according to the allocation information of the available channels: determining that cached data exists on the station.

Still further, the device indication information is further used to indicate the non-to-be-scheduled station. If the station is not the to-be-scheduled station, the processor 131 may further perform the following operation before selecting the at least one idle channel or idle sub-channel from the random competition channel according to the allocation information of the available channels: determining, according to the device indication information, that the station is the non-to-be-scheduled station.

Yet further, the processor 131 may further perform the following operation: starting waiting upon receiving the control frame, and sending the request to send frame only when waiting duration is equal to preset duration.

It can be understood that a function of each function module of the access point 13 in this embodiment can be specifically implemented according to the methods in the foregoing method embodiments. For specific descriptions, correspondingly refer to related descriptions of the method embodiments in FIG. 8 and FIG. 9, and details are not described herein again.

Figure 14:
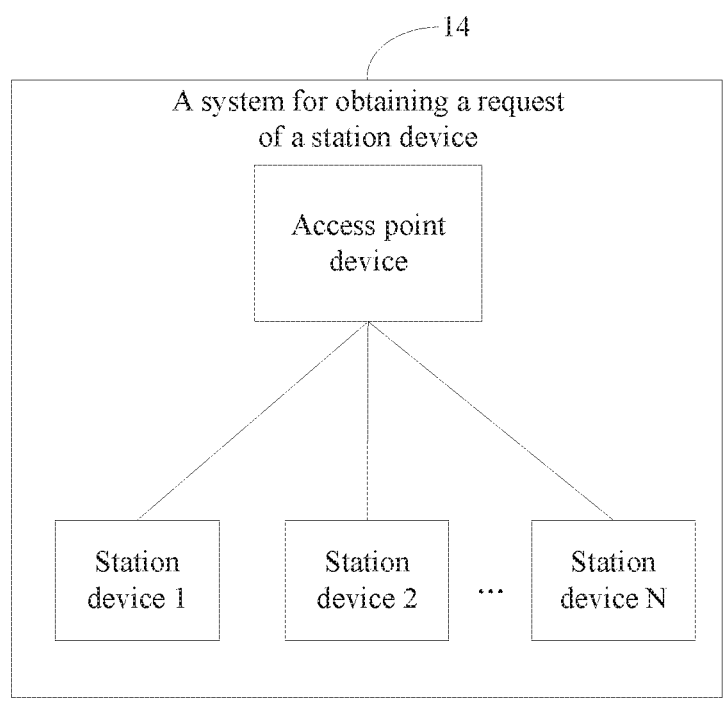
FIG. 14 is a schematic structural diagram of a system for obtaining a request of a station according to an embodiment of the present invention.

Referring to FIG. 14, FIG. 14 is a schematic structural diagram of a system for obtaining a request of a station according to an embodiment of the present invention. The system for obtaining a request of a station according to this embodiment of the present invention includes an access point and at least one station. N in FIG. 14 represents a quantity of station s, and N is an integer. For the access point, refer to the embodiments corresponding to FIG. 10 and FIG. 11. For the station, refer to the embodiments corresponding to FIG. 12 and FIG. 13. Details are not described herein again.

An embodiment of the present invention further provides a computer storage medium. The computer storage medium stores a program. During execution of the program, some or all of the steps in the methods described with reference to FIG. 1 to FIG. 7 in the embodiments of the present invention are executed.

An embodiment of the present invention further provides a computer storage medium. The computer storage medium stores a program. During execution of the program, some or all of the steps in the methods described with reference to FIG. 8 and FIG. 9 in the embodiments of the present invention are executed.

Sequence adjustment, combination, and deletion may be performed on the steps of the methods in the embodiments of the present invention according to an actual need.

Combination, division, and deletion may be performed on the modules of the apparatuses in the embodiments of the present invention according to an actual need.

In descriptions in this specification, descriptions about such reference terms as "an embodiment," "some embodiments," "an example," "a specific example," and "some examples" mean that specific features, structures, materials, or characteristics described with reference to the embodiments or examples are included in at least one embodiment or example of the present embodiments. In this specification, the illustrative descriptions about the foregoing terms do not necessarily concern a same embodiment or example. In addition, the described specific features, structures, materials, or characteristics may be combined in a proper manner in any one or more of the embodiments or examples. In addition, persons skilled in the art may integrate or combine different embodiments or examples and characteristics of different embodiments or examples described in this specification, as long as they do not conflict with each other.

In addition, the terms "first" and "second" are merely intended for a purpose of description, and shall not be understood as an indication or implication of relative importance or an implicit indication of a quantity of indicated technical features. Therefore, a feature limited by "first" or "second" may explicitly or implicitly include at least one of the features. In the descriptions about the present embodiments, "multiple" means at least two, for example, two or three, unless otherwise specifically limited.

Descriptions about any process or method described in a flowchart or in another manner herein may be understood as indicating that one or more modules, segments, or parts of code that can execute an instruction and that is used to implement a specific logical function or a step of a process are included, the scope of preferred implementations of the present embodiments includes other implementation, and functions may be performed in a sequence other than a shown or discussed sequence, including in a generally simultaneous manner or a reverse sequence according to the functions concerned. This should be understood by persons skilled in the technological field to which the embodiments of the present invention belong.

Logic and/or steps, for example, program lists of executable instructions regarded as configured to implement logical functions, indicated in flowcharts or described herein in another manner can be specifically implemented in any computer readable medium, so as to be used by an instruction-executing system, apparatus, or device (for example, a computer-based system, a system that includes a processor, or another system that can obtain an instruction from an instruction-executing system, apparatus, or device and execute the instruction), or be used in combination with the instruction-executing system, apparatus, or device. With respect to this specification, the "computer readable medium" may be any apparatus that can include, store, communicate, propagate, or transmit a program so that the program can be used by the instruction-executing system, apparatus, or device or be used in combination with the instruction-executing system, apparatus, or device. More specific examples (a non-exhaustive list) of the computer readable medium include the following: an electrical connection part (an electronic apparatus) that has one or more laid wires, a portable computer disk box (a magnetic apparatus), a random access memory (RAM), a read-only memory (ROM), an erasable programmable read only memory (EPROM or a flash memory), an optical fiber apparatus, and a portable compact disc read-only memory (CDROM). In addition, the computer readable medium may even be a paper on which the program can be printed or another suitable medium. This is because the program can be obtained in an electronic manner by performing optical scanning on the paper or the another medium and then performing edition and decoding, or by performing processing in another proper manner when necessary, and then the program is stored in a computer memory.

Persons of ordinary skill in the art may understand that all or some of the steps of the methods in the foregoing embodiments may be implemented by a program instructing related hardware. The program may be stored in a computer readable storage medium. During execution of the program, one or a combination of the steps of the method embodiments is performed.

In addition, functional units in the embodiments of the present invention may be integrated into one processing module, or each unit may exist alone physically, or two or more units may be integrated into one module. The integrated module may be implemented in a form of hardware, or may be implemented in a form of a functional module of software. If the integrated module is implemented in a form of a functional module of software and is sold or used as an independent product, the integrated module may be stored in a computer readable storage medium.

The foregoing storage medium may be a read-only memory, a magnetic disk, an optical disk, or the like. Although the embodiments of the present invention are shown and described above, it can be understood that the foregoing embodiments are examples and cannot be understood as a limitation on the present embodiments. Within the scope of the present embodiments, persons of ordinary skill in the art may make changes, modifications, replacement, and variations to the foregoing embodiments.

What is claimed is:

1. An apparatus comprising:
   a processor; and
   a transceiver configured to communicate with the processor through an internal connection;
   wherein the processor is configured to:
      construct a control frame, the control frame comprising to-be-scheduled station user information and not-to-be-scheduled station user information, the to-be-scheduled station user information comprising indication information indicating a to-be-scheduled station and allocation information indicating a part of sub-channel of an available channel allocated to the to-be-scheduled station, the not-to-be-scheduled station user information comprising indication information indicating a not-to-be-scheduled station and allocation information indicating another part of sub-channel of the available channel allocated to the not-to-be-scheduled station; and
      control the transceiver to send the control frame.

2. The apparatus of claim 1, wherein the indication information indicating the to-be-scheduled station comprises identifier information of the to-be-scheduled station.

3. The apparatus of claim 1, wherein the transceiver is further configured to receive a frame that requests to send according to the control frame; and
   the processor is further configured to perform resource scheduling according to the frame that requests to send.

4. The apparatus according to claim 1, wherein the to-be-scheduled station user information comprises first user information and second user information, the first user information comprising first indication information indicating a first to-be-scheduled station and first allocation information indicating a first sub-channel in a part of sub-channel of the available channel allocated to the first to-be-scheduled station, the second user information comprising second indication information indicating a second to-be-scheduled station and second allocation information indicating a second sub-channel in a part of sub-channel of the available channel allocated to the second to-be-scheduled station.

5. The apparatus according to claim 1, wherein the available channel comprises one idle channel, and wherein the processor is further configured to:
   allocate a part of sub-channel of the one idle channel to the to-be-scheduled station, and
   allocate another part of sub-channel of the one idle channel to the not-to-be-scheduled station.

6. The apparatus according to claim 1, wherein the available channel comprises at least two idle channels, and wherein the processor is further configured to:
   allocate a part of sub-channel of the at least two idle channels to the to-be-scheduled station, and
   allocate another part of sub-channel of the at least two idle channels to the not-to-be-scheduled station.

7. The apparatus according to claim 1, wherein the available channel comprises at least two idle channels, and wherein the processor is further configured to:
   allocate a part of sub-channel of each channel of the at least two idle channels to the to-be-scheduled station, and
   allocate another part of sub-channel of each channel of the at least two idle channels to the not-to-be-scheduled station.

8. An Apparatus comprising:
   a processor; and
   a transceiver configured to communicate with the processor through an internal connection;
   wherein the processor is configured to control the transceiver to:
      receive a control frame, the control frame comprising to-be-scheduled station user information and not-to-be-scheduled station user information, the to-be-scheduled station user information comprising indication information indicating a to-be-scheduled station and allocation information indicating a part of sub-channel of an available channel allocated to the to-be-scheduled station, the not-to-be-scheduled station user information comprising indication information indicating a not-to-be-scheduled station and allocation information indicating another part of sub-channel of the available channel allocated to the not-to-be-scheduled station; and
      send a frame that requests to send according to the control frame.

9. The apparatus according to claim 8, wherein the indication information indicating the to-be-scheduled station comprises identifier information of the to-be-scheduled station.

10. The apparatus according to claim 8, wherein the frame that requests to send is sent on the part of sub-channel of the available channel in response to the apparatus being the to-be-scheduled station.

11. The apparatus according to claim 8, wherein the frame that requests to send is sent on another part of sub-channel of the available channel in response to the apparatus being the not-to-be-scheduled station.

12. The apparatus according to claim 8, wherein the transceiver is configured to receive resource scheduling after sending the frame that requests to send.

13. A non-transitory computer-readable medium storing computer instructions, that in response to being executed by a processor, cause the processor to:
 construct a control frame comprising to-be-scheduled station user information and not-to-be-scheduled station user information, the to-be-scheduled station user information comprising indication information indicating a to-be-scheduled station and allocation information indicating a part of sub-channel of an available channel allocated to the to-be-scheduled station, the not-to-be-scheduled station user information comprising indication information indicating a not-to-be-scheduled station and allocation information indicating another part of sub-channel of the available channel allocated to the not-to-be-scheduled station; and
 control a transceiver to send the control frame.

14. The non-transitory computer-readable medium according to claim 13, wherein the indication information indicating the to-be-scheduled station comprises identifier information of the to-be-scheduled station.

15. The non-transitory computer-readable medium according to claim 13, wherein the instructions, in response to being executed by the processor, cause the processor to configure the transceiver to receive a frame that requests to send according to the control frame.

16. The non-transitory computer-readable medium according to claim 15, wherein the instructions, in response to being executed by the processor, cause the processor to perform resource scheduling according to the frame that requests to send.

17. The non-transitory computer-readable medium according to claim 13, wherein the to-be-scheduled station user information comprises first user information and second user information, the first user information comprising first indication information indicating a first to-be-scheduled station and first allocation information indicating a first sub-channel in a part of sub-channel of the available channel allocated to the first to-be-scheduled station, the second user information comprising second indication information indicating a second to-be-scheduled station and second allocation information indicating a second sub-channel in a part of sub-channel of the available channel allocated to the second to-be-scheduled station.

18. The non-transitory computer-readable medium according to claim 13, wherein the available channel comprises one idle channel, and wherein the instructions, in response to being executed by the processor, cause the processor to:
 allocate a part of sub-channel of the one idle channel to the to-be-scheduled station, and
 allocate another part of sub-channel of the one idle channel to the not-to-be-scheduled station.

19. The non-transitory computer-readable medium according to claim 13, wherein the available channel comprises at least two idle channels, and wherein the instructions, in response to being executed by the processor, cause the processor to:
 allocate a part of sub-channel of the at least two idle channels to the to-be-scheduled station, and
 allocate another part of sub-channel of the at least two idle channels to the not-to-be-scheduled station.

20. The non-transitory computer-readable medium according to claim 13, wherein the available channel comprises at least two idle channels, and wherein the instructions, in response to being executed by the processor, cause the processor to:
 allocate a part of sub-channel of each channel of the at least two idle channels to the to-be-scheduled station, and
 allocate another part of sub-channel of each channel of the at least two idle channels to the not-to-be-scheduled station.

* * * * *